United States Patent
Ahn

(10) Patent No.: US 10,846,758 B2
(45) Date of Patent: *Nov. 24, 2020

(54) SYSTEMS AND METHODS FOR CREATING A NAVIGABLE PATH BETWEEN PAGES OF A NETWORK PLATFORM BASED ON LINKING DATABASE ENTRIES OF THE NETWORK PLATFORM

(71) Applicant: FAPL, LLC, Los Angeles, CA (US)

(72) Inventor: Insung Ahn, Los Angeles, CA (US)

(73) Assignee: FAPL, LLC, Los Angeles, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/011,415

(22) Filed: Jun. 18, 2018

(65) Prior Publication Data

US 2019/0087869 A1 Mar. 21, 2019

Related U.S. Application Data

(63) Continuation of application No. 15/592,112, filed on May 10, 2017, now Pat. No. 10,002,370.

(60) Provisional application No. 62/334,365, filed on May 10, 2016.

(51) Int. Cl.
*G06Q 30/02* (2012.01)
*G06F 16/51* (2019.01)
*G06F 40/106* (2020.01)
*G06F 40/134* (2020.01)

(52) U.S. Cl.
CPC ......... *G06Q 30/0276* (2013.01); *G06F 16/51* (2019.01); *G06F 40/106* (2020.01); *G06F 40/134* (2020.01); *G06Q 30/0277* (2013.01)

(58) Field of Classification Search
CPC ............ G06Q 30/0276; G06Q 30/0277; G06F 40/134
See application file for complete search history.

(56) References Cited

U.S. PATENT DOCUMENTS

| 7,675,528 | B2 | 3/2010 | Walker, Jr. et al. |
| 8,275,590 | B2 | 9/2012 | Szymczyk et al. |
| 8,296,291 | B1 | 10/2012 | Desjardins |
| 8,589,242 | B2 | 11/2013 | Gonsalves et al. |
| 8,606,643 | B2 | 12/2013 | Lawrence et al. |
| 8,682,728 | B2 | 3/2014 | Konkol et al. |

(Continued)

FOREIGN PATENT DOCUMENTS

| JP | 2007-114954 A | 5/2007 |
| KR | 10-2013-0038534 A | 4/2013 |
| WO | WO16082032 | 6/2016 |

OTHER PUBLICATIONS

Modern Masters, "How to Tag Products on Houzz", Feb. 23, 2015, Modern Masters Café Blog, in 8 pages.

(Continued)

*Primary Examiner* — Asher D Kells
(74) *Attorney, Agent, or Firm* — Knobbe Martens Olson & Bear, LLP

(57) ABSTRACT

The disclosure herein provides systems and methods for linking database entries of a network platform. The network platform provides a plurality of pages each dedicated to an item and including details of the item. A user-uploaded content can be linked to two or more of such pages or items provided on the network platform such that a navigable path is created among such pages or items. The linked pages or items may include an intermediary page or content that is linked to each of such pages or items.

20 Claims, 26 Drawing Sheets

(56) References Cited

U.S. PATENT DOCUMENTS

| | | |
|---|---|---|
| 9,081,856 B1 | 7/2015 | Scott et al. |
| 2007/0035755 A1 | 2/2007 | Maki et al. |
| 2011/0184780 A1 | 7/2011 | Alderson et al. |
| 2013/0226711 A1 | 8/2013 | Wu et al. |
| 2014/0052784 A1 | 2/2014 | Aldamiz Echevarria et al. |
| 2014/0129353 A1 | 5/2014 | Spevak |
| 2014/0270533 A1 | 9/2014 | Chedeau |
| 2014/0278998 A1 | 9/2014 | Systrom et al. |
| 2014/0279039 A1 | 9/2014 | Systrom et al. |
| 2014/0279068 A1 | 9/2014 | Systrom et al. |
| 2015/0006301 A1 | 1/2015 | McMillion |
| 2015/0058106 A1 | 2/2015 | Van Sickle |
| 2015/0074512 A1 | 3/2015 | Everingham et al. |
| 2015/0120415 A1 | 4/2015 | Chan |

OTHER PUBLICATIONS

Office Action for corresponding Korean Application No. 10-2018-7035688 with its English Translation—18 pages (dated Aug. 21, 2020).

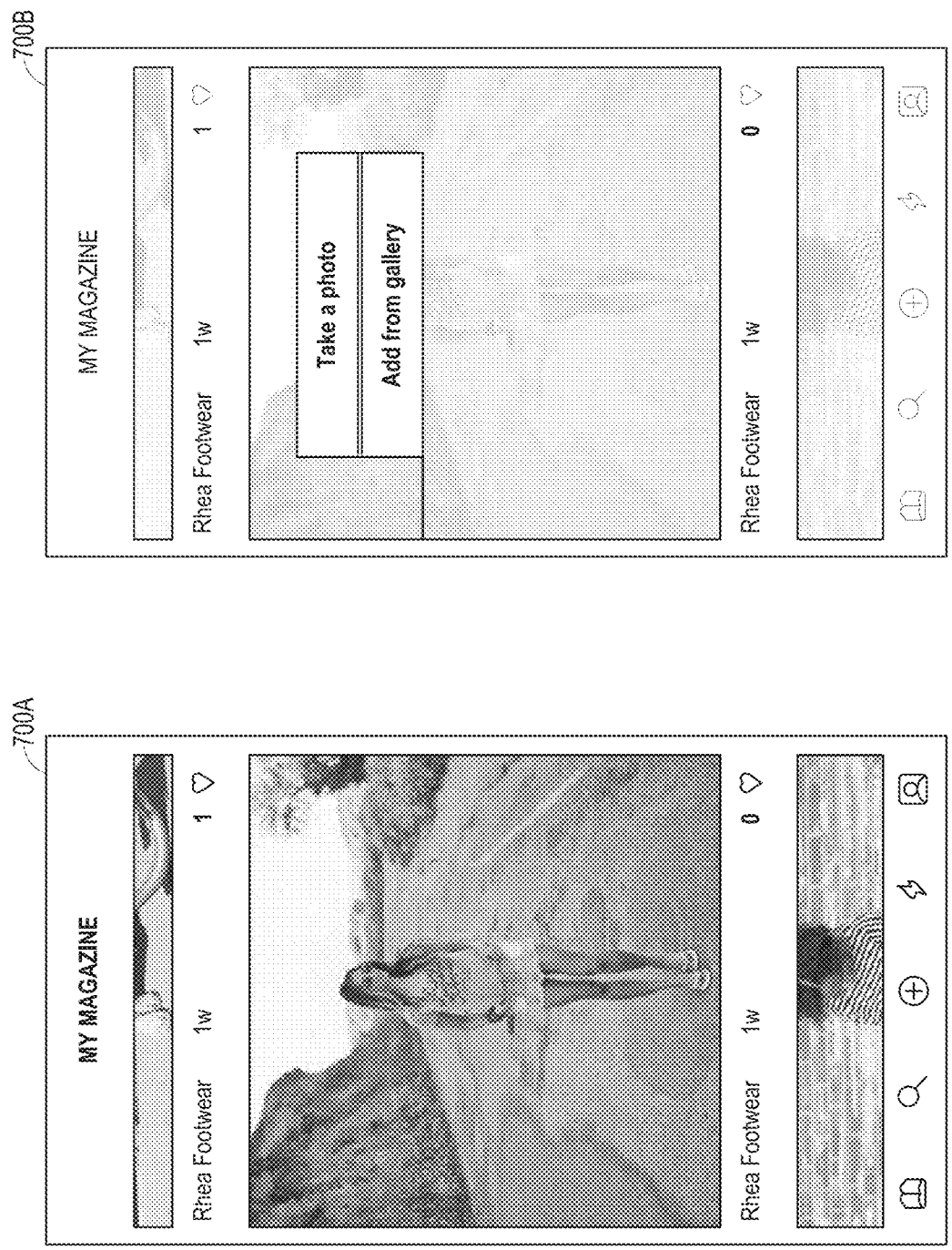

SYSTEMS AND METHODS FOR CREATING A NAVIGABLE PATH BETWEEN PAGES OF A NETWORK PLATFORM BASED ON LINKING DATABASE ENTRIES OF THE NETWORK PLATFORM

RELATED APPLICATIONS

This application is a continuation of U.S. patent application Ser. No. 15/592,112, filed on May 10, 2017 and titled "SYSTEMS AND METHODS FOR CREATING A NAVIGABLE PATH BETWEEN PAGES OF A NETWORK PLATFORM BASED ON LINKING DATABASE ENTRIES OF THE NETWORK PLATFORM," which claims priority to U.S. Provisional Application No. 62/334,365, filed on May 10, 2016 and titled "SYSTEMS AND METHODS FOR FACILITATING GENERATION OF USER CONTENT AND APPROVAL AND PUBLICATION OF USER-REQUESTED ASSOCIATIONS." Any and all applications for which a foreign or domestic priority claim is identified in the Application Data Sheet as filed with the present application are hereby incorporated herein by reference in their entirety under 37 CFR 1.57.

BACKGROUND

Technical Field

The present disclosure generally relates to database entry modification, and in particular, database entry modification in the context of networked publication platforms.

Description of Related Technology

Various online platforms such as Facebook®, Instagram®, and Twitter® allow users to upload content for viewing by other users of the platforms. For example, fashion bloggers may upload photographs featuring the latest fashion trends, and food enthusiasts may upload pictures to document their latest food adventures. In addition, companies such as fashion brands, electronics manufacturers, and sellers of other goods may utilize such online platforms to promote their products. For example, a fashion brand may generate advertising content featuring models or celebrities wearing clothes designed by the fashion brand and upload such content on the online platforms to generate an interest in the brand among the users of the online platforms. Such platforms may utilize databases to store such content.

BRIEF DESCRIPTION OF THE DRAWINGS

The foregoing and other features, aspects and advantages of the present invention are described in detail below with reference to the drawings of various embodiments, which are intended to illustrate and not to limit the invention. The drawings comprise the following figures in which:

FIGS. 7A-7M illustrate pages presented via a user device in accordance with an embodiment;

DETAILED DESCRIPTION OF EMBODIMENTS

Figure 1A:
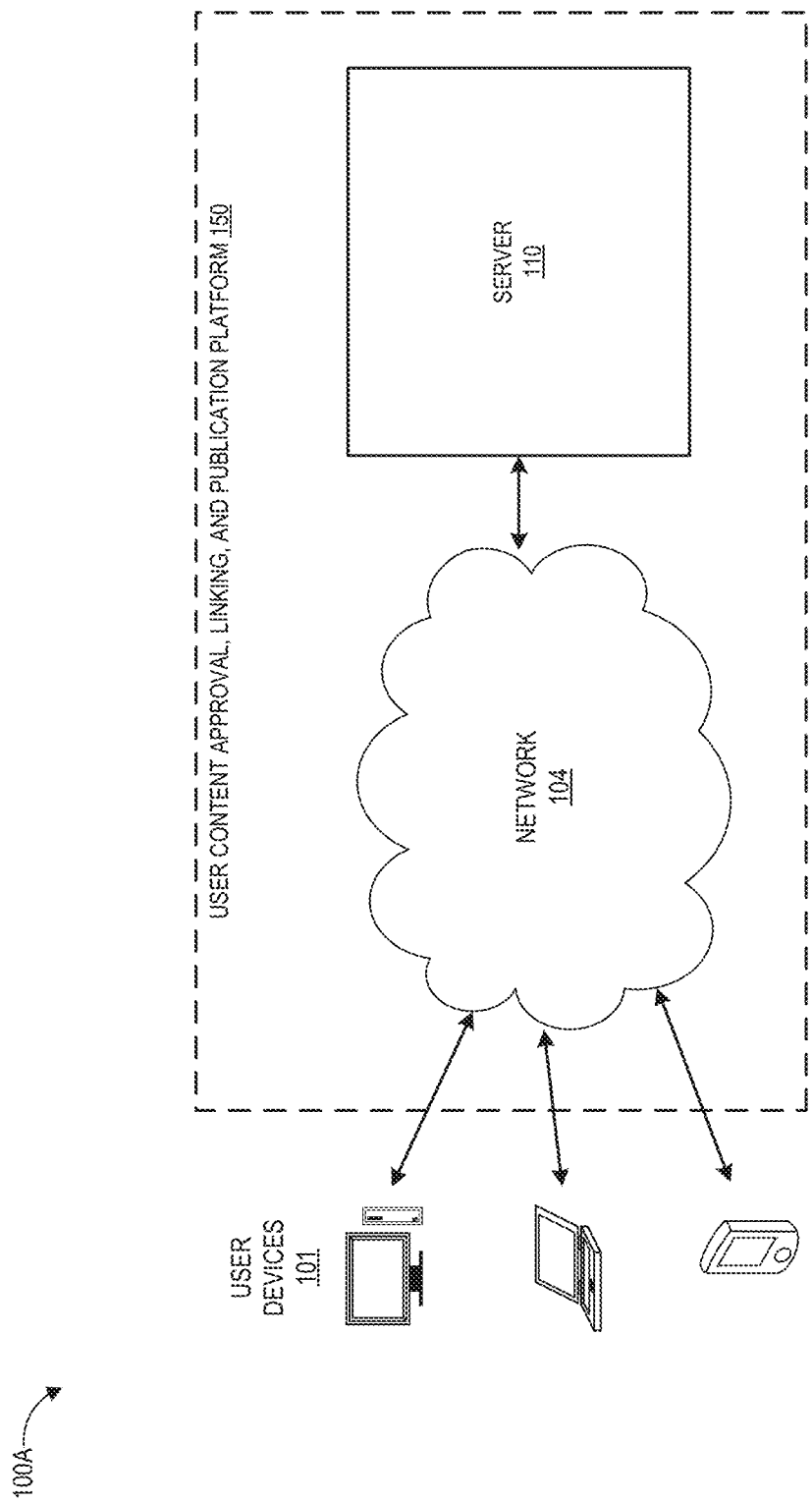
FIG. 1A illustrates a computing environment in accordance with an embodiment.

Embodiments of the invention will now be described with reference to the accompanying figures. The terminology used in the description presented herein is not intended to be interpreted in any limited or restrictive manner, simply because it is being utilized in conjunction with a detailed description of certain specific embodiments of the invention. Furthermore, embodiments of the invention may comprise several novel features, no single one of which is solely responsible for its desirable attributes or which is essential to practicing the inventions herein described.

The present disclosure generally relates to a system for facilitating generation of user content and creation of links between such user content and products available on one or more platforms.

Overview

Today, many brands, manufacturers, and other sellers of products spend large sums of money to promote their products. For example, to impress the consumers, they may hire models and celebrities to produce presentation materials including photos and videos that depict their products in a favorable light. These presentation materials may appear in magazines or other publication platforms. However, producing such presentation materials can be very costly and may not always result in an increase in sale.

Navigating Through User-Uploaded Content on a Publication Platform

One example of a publication platform is a social media website or application for viewing and sharing user-uploaded content. When a user (who wishes to view content uploaded by other users) subscribes to a group of users of the platform, the platform may present to the user ("content viewing user") a newsfeed including a collection of photos and videos uploaded by the users in the group. The content viewing user may click on any of the photos and videos to learn more about the photo or video. The content viewing user may navigate to a page dedicated to a specific user ("content generating user"), and the page may include a list of photos and videos uploaded by the specific content generating user. The content viewing user may click on any of the photos and videos on the specific content generating user's page to learn more about the photo or video uploaded by the specific content generating user.

Navigating to Another User-Uploaded Content

The content viewing user may be, for example, viewing a photo in which the content generating user is wearing a red sweater. The content viewing user may wish to see how the same red sweater would look on someone else. However, existing implementations do not allow a user to easily navigate from a user-uploaded photo showing a person wearing an item to another user-uploaded photo showing another person wearing the same item.

Navigating Through Pages on a Publication Platform

Another example of a publication platform is a brand's website or application. A user may visit the brand's website and browse various items offered by the brand. For example, to browse the brand's sweater collection, the user may activate selectable options that read "Men," and then "Clothing," and then "Sweaters" in sequence to arrive at a page displaying a list of sweaters offered by the brand. The user may click on Sweater A from the list of sweaters to arrive at a page dedicated to Sweater A including details about Sweater A. The page dedicated to Sweater A may include a selectable option for purchasing Sweater A. If the user wishes to look at another sweater, the user can then press the back button on his browser to return to the list of sweaters and then click on Sweater B to arrive at a page dedicated to Sweater B including details about Sweater B. If the user likes Sweater B, the user may purchase Sweater B on the page dedicated to Sweater B.

Navigating to Another Page

Before purchasing Sweater B, the user may wish to see photos showing how other people are wearing Sweater B or photos showing with what other items other people are wearing Sweater B. However, existing implementations do not allow a user to easily navigate from a page showing an item to another page showing another item via a photo showing a person wearing both of those items.

Improvements

Various embodiments of the present disclosure allow a user to upload a user content such as a photo depicting one or more products of a given seller and to associate the uploaded user content with such products. Upon reviewing the associations created by the user, if the given seller decides that the user-uploaded content is not in line with the seller's image or does not accurately portray the seller's products, the seller may reject the associations created by the user. On the other hand, if the given seller likes the user-uploaded content and wishes to publish the user-uploaded content to other users of the platform, the seller can simply approve the association between the user-uploaded content and the seller's products. Upon such approval, the user-uploaded content can be presented to the users of the platform and navigable paths (i) between the products (or the products' pages) via the user-uploaded content and (ii) between the user-uploaded content and other content associated with any of the products associated with the user-uploaded content may be created such that the users can easily navigate between the products and the user-uploaded contents.

Computing Environment

FIG. 1A illustrates a computing environment 100A in which users can upload content and browse the content uploaded by other users. User devices 101 communicate with a server 110 via a network 104. The server 110 provides access to information regarding products offered by various sellers or brands (not shown) registered with the server 110.

Users

The users accessing the server 110 via the user devices 101 may be consumers interested in browsing the content available on the server 110 and/or purchasing the products available on the server 110. The users may also be brand owners interested in promoting their products to other users in the environment 100A. The users may also be models or other content generators interested in providing content to attract followers or fans. For example, user content generated and/or uploaded by the brand owners and/or the models can be viewed by other users in the environment 110A who wish to learn about the various products offered by the brand owners and/or learn about the latest trends in, for example, the fashion industry.

Forms of User Content

In embodiments, user content includes photos, although not limited thereto. For example, the user content can be videos or audiovisual contents depicting an item or a brand available in the environment 100A (e.g., registered with the server 110).

User Content Approval, Linking, and Publication Platform

The server 110 providing various services via the network 104 and/or special software installed on the user devices 101 for providing a user interface on the user devices 101 at the direction of the server 110 may be collectively referred to herein as a user content approval, linking, and publication platform (or "platform"). For example, such a platform may be accessed by the user devices 101 at a dedicated website via a browser provided on the user devices 101 or a mobile application installed on the user devices 101. In this disclosure, an action described as being performed by the platform may be performed solely by the server 110, solely by the user device 101 via which the user is accessing the server 110, or by both the server 110 and the user device in a distributed manner.

Overview of Use Case on Platform

The platform may allow a user to upload a user photo depicting one or more products and to identify the one or more products in the platform's database. The platform may send an approval request to each brand owner associated with the products identified by the user. Upon receiving approvals from the brand owners, the platform publishes the user photo along with the products depicted in the user photo. For example, the user photo may appear on the respective product pages dedicated to such products. As another example, the user photo may be published to other users of the platform along with an identification of each of such products, so that such users can identify (and purchase, if interested) the products that are being shown in the user photo. If a purchase of one of such products is made by a viewing user after viewing the user photo uploaded by the uploading user, the uploading user is provided a monetary reward or other incentives to encourage further generation and upload of user content that can be utilized by the brand owner.

Brand Owner

The phrase "brand owner" refers to a user having administrative access to a particular brand on the platform or is otherwise in charge of managing the particular brand on the platform. Such a brand owner may register the brand with the platform and create, on the platform, item pages providing details of the respective items sold or promoted by the brand and allowing users of the platform to be able to purchase the respective items. The brand owner may approve or disapprove link requests from other users (e.g., content generators) of the platform.

Item Pages

Each item page of a particular item provided on the platform may include details regarding the particular item, such as one or more pictures of the item, a description of the item, a price of the item, etc. The item pages may be created on the platform at the direction of the brand owners (e.g., via a brand owner user interface provided by the platform) who sell or promote the items on the platform.

Items

The items described herein may include any item or product associated with one or more clients, brands, designers, manufacturers, distributers, sellers, vendors, owners, etc. (collectively referred to herein as clients or brand owners). In embodiments, the item can include any type of clothing, footwear, beauty products, electronic devices, jewelry, household products, etc. In this disclosure, the term "item" is used interchangeably to refer to an item itself (e.g., a particular product, service, any of the items referred to above, or the like) and to its description or representation in a computer system. As will be apparent from the context in which it is used, the term is also sometimes used herein to refer only to the item itself or only to its representation in the computer system.

Pages

The pages described herein may include any pages, screens, presentations, screen representations, content, etc. (collectively referred to herein as pages). In some embodiments, the pages are accessible using uniform resource locators (URLs) or other addresses. For example, a picture of an item displayed via the display screen by the mobile application may be associated with a URL to a page maintained on the server 110. Upon user selection of the picture, the URL associated with the picture may be accessed and displayed to the user. In other embodiments, the pages are dynamically generated without being assigned any URLs or addresses. For example, when a picture of an item is selected via the user interface provided by the mobile application, the mobile application transmits an item ID associated with the selected item, and the server 110 may generate an item page corresponding to the selected item based on the received item ID (e.g., by accessing the database and determining which pictures and descriptions are linked to the item having the received item ID, and compiling a page including the pictures and descriptions).

Users and User Devices

Figure 1B:
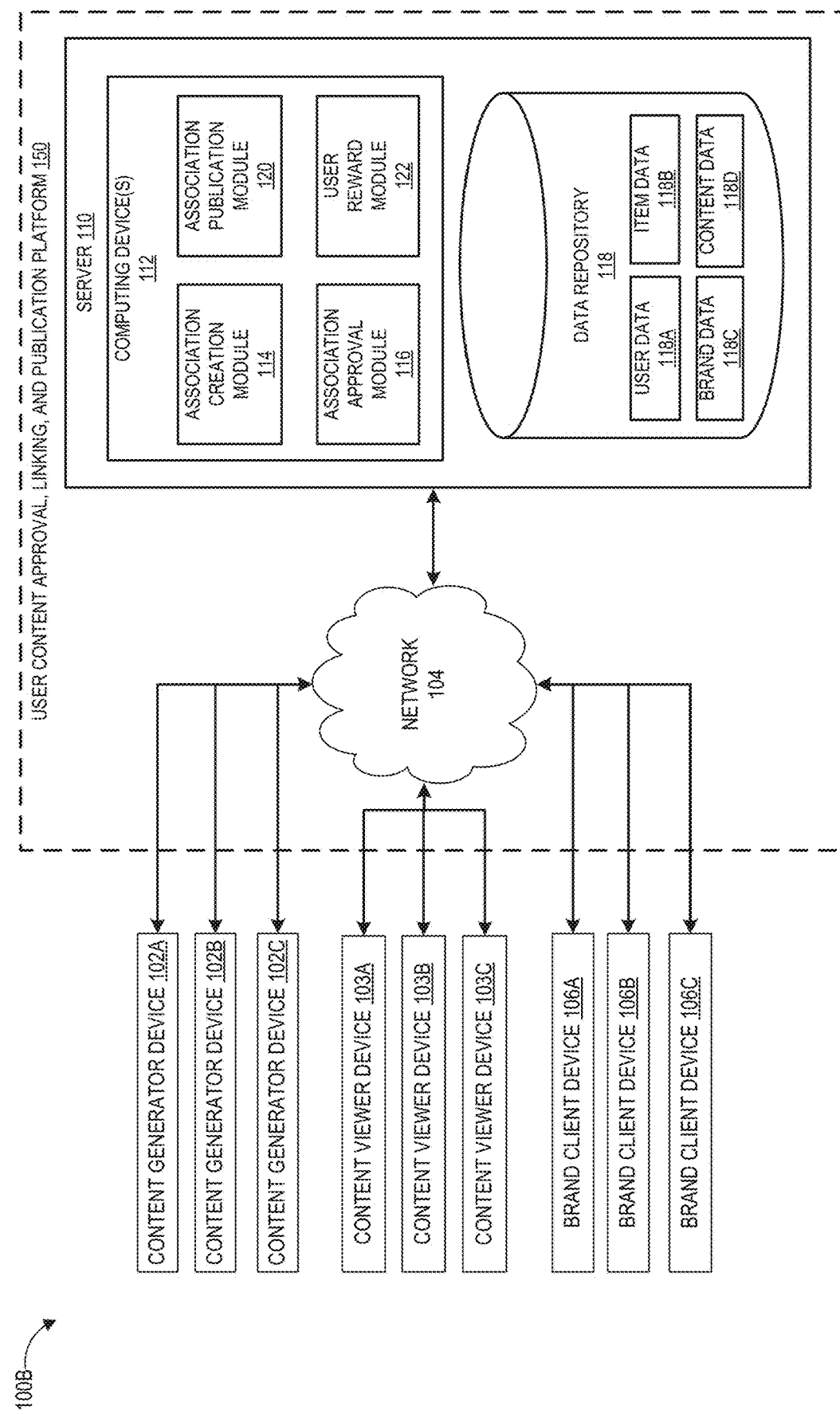
FIG. 1B illustrates a more detailed computing environment in accordance with an embodiment.

Referring to FIG. 1B, content generator devices 102A-102C of content generating users, content viewer devices 103A-103C of content viewing users, and brand client devices 106A-106C of brand owners are illustrated. Content generating users are those who upload content onto the server 110. Content viewing users are those who view the content uploaded by content generating users. Brand owners are those who publish and sell products on the platform, such as clients, brands, designers, manufacturers, distributers, sellers, vendors, owners, etc. (collectively referred to herein as clients or brand owners). Although the content generator devices, the content viewer devices, and the brand client devices are illustrated separately in FIG. 1B, in embodiments, a single computing device may operate as one or more of content generator computing device 102, a content viewer computing device 103, and a brand client computing device 106. Each device may be a desktop computer, a laptop computer, a portable computing device, a smartphone, a tablet computer, or any other computing device.

Network

The user devices of FIG. 1B access the server 110 via the network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks such as the Internet. Protocols and components for communicating via the Internet or any of the other aforementioned types of communication networks are well known to those skilled in the art and, thus, are not described in more detail herein.

User Interface

The platform may provide the user devices with one or more user interfaces for utilizing one or more services provided by the platform and/or performing various transactions (e.g., managing user accounts, uploading user photos, viewing user photos, generating link requests to link user photos to items offered on the platform, approving link requests to link user photos to items, updating user profiles, purchasing items, providing user rewards to user-photo-uploading users, etc.) on the platform. For example, the user devices may have a browser application implemented thereon or a mobile application dedicated to the platform that uses text, graphics, audio, video, and other media to present data and to allow interaction with the platform.

User Actions Performed on the Platform

A number of user actions may be available for the users to perform on the platform, such as to provide a positive indication (e.g., "like") on a user photo uploaded by another user (e.g., content generator, brand owner, etc.), to follow another user (e.g., fashion bloggers, celebrities, brand owners, etc.), to like particular items sold or promoted by the various brand owners registered on the platform, to purchase items sold or promoted by the various brand owners registered on the platform, visit individual item pages that provide audiovisual or textual descriptions of the corresponding items, etc.

Services Provided by the Platform

In the environment illustrated FIG. 1B, the platform allows content generating users to upload, via the content generator devices 102, photos that can be approved by brand owners and utilized to promote the brand owners' products in exchange for a reward. In addition, the platform allows brand owners to access, via the brand client devices 106, an abundance of user-generated content (e.g., photos and videos featuring the brand owners' products) that can be used to promote their products without having to arrange expensive photo or video sessions with models or celebrities. Further, the platform allows content viewing users to create, via the content viewer devices 103, a customized view of the photos and other content uploaded by the content generating users or the brand owners, essentially allowing the content viewing users to create their own "magazines" of photos and other content based on their personal taste. These services offered by the platform may be facilitated by, as illustrated in FIG. 1B, the one or more computing devices 112 providing an association creation module 114, an association approval module 116, an association publication module 120, and a user reward module 122. The modules (e.g., 112, 114, 116, 120, among others) and other functionalities of the platform described herein may be implemented using software code stored on physical computer storage, where the software code, when executed by one or more processors, causes the one or more processors to perform the one or more techniques described herein. The server 110 may provide other modules or services not illustrated in FIG. 1B.

Association Creation Module

The association creation module 114 can allow users (e.g., content generating users) to create or request an association between a user photo uploaded by the user and one or more items registered or otherwise available on the platform. As shown in FIGS. 7C-7F described below, users can choose to upload a photo and link one or more items to the photo (in FIG. 7F, the user has created a request to associate the user photo with a pair of boots made by Rhea Footwear). The term "association" as used herein refers to a link created in the database of the platform between a user photo and an item offered on the platform such that a navigable path is created (e.g., upon brand approval or without brand approval) between the item and another item linked to the user photo and/or between the user photo and another user photo linked to the item. The techniques for creating or requesting associations are described in greater detail below with reference to FIGS. 2-11.

Association Approval Module

The association approval module 116 can facilitate requesting and receiving brand approval of associations (e.g., the two pairs of shoes requested to be associated with the user photo in FIG. 7H described below) created or requested by content generating users. In response to receiving a request to create an association between a user photo and one or more items, the association approval module 116 identifies the brand owner(s) associated with the items and requests approval from each identified brand owner. The techniques for requesting and receiving approval of associations are described in greater detail below with reference to FIGS. 2-11.

Association Publication Module

The association publication module 120 can publish a brand-approved association between a user photo and one or more products such that the user photo is displayed or becomes viewable along with the one or more products with which the user photo is associated. As shown in FIG. 7K, the user photo uploaded by "MR_FASHION" in FIGS. 7A-7J is displayed on Rhea Footwear's item page for the pair of boots associated with the user photo along with the photo of the pair of boots. The publication may include presenting the user photo along with the items associated with the user photo to users (e.g., content viewing users) following or subscribing to the brand owner approving the associations (e.g., in such users' news feeds). Additionally or alternatively, the publication may include reflecting the brand-approved associations on the individual item pages by, for example, allowing any user visiting an item page corresponding to a brand item whose association with a user photo has been approved by the brand owner to view the user photo featuring the brand item (e.g., sweater page showing a user-uploaded photo featuring a person wearing the sweater). The techniques for publishing brand-approved associations are described in greater detail below with reference to FIGS. 2-11.

User Reward Module

To encourage users to upload user content and create associations between such user content and various sellers' products, the user reward module 122 can provide a user reward to a content generating user when an association previously created by the content generating user generates a predetermined type of user actions on the platform, such as a purchase, a like, a follow, etc. For example, if the user-created association between a user photo and an item generates a sale of the item, a fraction of the sale price paid by the purchasing user may be provided to the user who created or requested the association (e.g., the original uploader who uploaded the user photo). The techniques for providing a user reward to a content generating user are described in greater detail below with reference to FIGS. 2-11.

Data Repository

The data repository 118 is depicted in FIG. 1B as having user data 118A, item data 118B, brand data 118C, and content data 118D. The user data 118A may include user type (e.g., guest user, registered user, affiliated user, administrative user, content generating user, content viewing user, content generating and viewing user, client user, etc.), purchase history (e.g., information regarding the user's prior purchases), browsing history (e.g., information regarding the items that the user previously browsed), search history (e.g., information regarding the user's prior searches on the platform), upload history (e.g., information regarding the user's prior user content uploads), user status (e.g., regular status, VIP status, etc., which may be determined based on the user's content generation history), and/or any other data or metadata associated with the users. The item data 118B may include various attributes of the items (e.g., products, contents, services, etc.) available on the platform. For example, the item data 118B may include price information, vendor information, visual information (e.g., pictures associated with the items), item type (e.g., clothing, cosmetic products, footwear, electronic devices, household products, magazine subscriptions, coupons, plumbing, legal consultations, or any other types of products, contents, or services that may be offered on the platform), and/or any other data or metadata associated with the items. The brand data 118C may include information associated with various existing or potential brand users (also referred to herein as clients or brand owners) of the platform. The content data 118D may include user-uploaded content such as photos and videos.

Database Entries

The data repository 118 may include one or more databases for storing data generated on the platform. For example, as illustrated by data structure 100C of FIG. 1C, the user data 118A may comprise a user database 160 having a set of database entries (e.g., user entries 160A-160C) that each correspond to one of the users of the platform, the item data 118B may comprise an item database 162 having a set of database entries (e.g., item entries 162A-162C) that each correspond to one of the items available on the platform (additionally or alternatively, an item available on another platform external to the platform), the brand data 118C may comprise a brand database 164 having a set of database entries (e.g., brand entries 164A-164C) that each correspond to one of the brands registered on the platform (additionally or alternatively, an item available on another platform external to the platform), and the content data 118D may comprise a content database 166 having a set of database entries (e.g., content entries 166A-166C) that each correspond to one of the user-uploaded contents on the platform. Each user, item, brand, or content on the platform may have a corresponding database entry in the one or more databases. Links (e.g., indicated by dashed arrows in FIG. 1C) may be created between database entries in response to a request to create an association between an item and a user-uploaded content or in response to an approval of such a request to create an association between the item and the user-uploaded content. For example, content uploading user may request that a user photo showing a sweater and a necklace be associated with the sweater and the necklace on the platform, and in response to receiving such a request (or upon brand approval of such a request) may cause the database entry corresponding to the user photo to refer to the database entry corresponding to the sweater and the database entry corresponding to the necklace, and cause each of the database entry corresponding to the sweater and the database entry corresponding to the necklace to refer to the database entry corresponding to the user photo. Such database entry linking techniques can be used to cause linking between database entries in response to any requests for association or approval of such requests described with reference to FIGS. 2-11.

Server

The server 110 may be implemented by one or more computing devices 112 that may communicate with data depository 118. The server 110 may also operate in a distributed computing environment including several computer systems that are interconnected using one or more computer networks. Moreover, the processing of the various components or modules of the server 110 can be distributed across multiple machines, networks, or other computing resources. The various components or modules of the server 110 can also be implemented in one or more virtual machines or hosted computing environment (e.g., "cloud") resources, rather than in dedicated servers.

Association, Approval, and Publication of User-Uploaded Photo

A publication platform described herein may allow a user to provide a photo, for example, featuring a person wearing a sweater and a pair of shoes made by a brand, request that the photo be associated with the sweater and the pair of shoes made the brand. Upon approval of the requested association by the brand, the photo may be published to other users of the platform in association with the brand and/or the sweater and the pair of shoes made the brand. For example, as shown in FIG. 7K, when a viewing user navigates to a page dedicated to the particular pair of shoes associated with the user-uploaded photo, the page may display a picture of the pair of shoes (at the top portion of 700K) along with the user-uploaded photo (at the bottom portion of 700K).

Workflow

Figure 2:
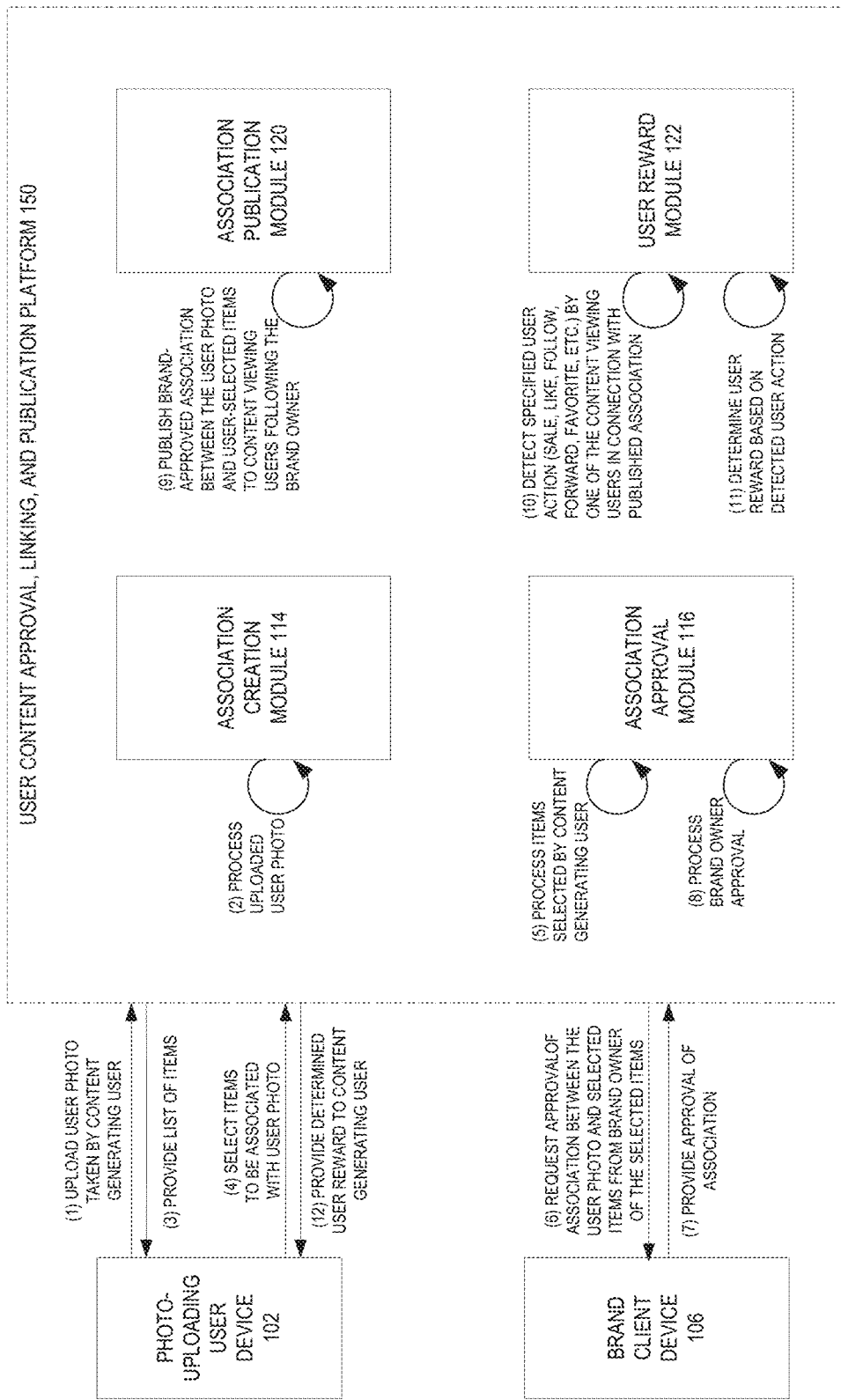
FIG. 2 illustrates a work flow within a platform in accordance with an embodiment.

With reference to FIG. 2, an example work flow illustrating such association, approval, and publication process on a publication platform is described. At (1), a content generating user uploads a user photo to the platform (e.g., via the user interface illustrated in FIG. 7B). The user photo may show a person wearing or using one or more items. Although the example of FIG. 2 is described with reference to a user photo, any other user content can be used, such as video, sound clip, text, or any other audiovisual data. At (2), in response to the upload of the user photo, the platform (e.g., association creation module 114) processes the uploaded user photo. At (3), in response to an indication that the user wishes to associate the user photo with one or more items (e.g., provided by user activation of a selectable option "Link items" provided in the user interface shown in FIG. 7C), the platform provides a list of items available on the platform to the user (e.g., via photo-uploading user device 102). Alternatively, in response to an indication that the user wishes to associate the user photo with one or more items, the platform provides a search interface, for example, as shown in FIG. 7D. At (4), from the list of items or the search interface presented to the user in (3), the user selects one or more items to be associated with or linked to the uploaded user photo. At (5), in response to the user's selection of the one or more items from the list of items or the search interface, the platform (e.g., association approval module 116) processes the items selected by the user. The platform may determine the identity of the brand owner associated with each of the items selected by the user. At (6), upon determining the identity of the brand owner of each of the selected items, the platform requests approval of the association or link to be created the user photo and each of the selected items to the corresponding brand owner of that item (e.g., via brand client device 106). At (7), upon reviewing the received approval request (e.g., via a brand owner interface and/or other modes of communication), the brand owner provides approval of the association or link between the user photo and the selected items of the brand owner to the platform. At (8), upon receiving the brand owner approval from the brand owner, the platform (e.g., association approval module 116) processes the brand owner approval. At (9), upon processing the brand approval, the platform (e.g., association publication module 120) publishes the brand-approved association to one or more content viewing users of the platform. For example, the platform may publish the association (e.g., the user photo along with one or more items linked to the user photo) to the followers or subscribers of the brand. In embodiments, the platform causes the user photo to be presented to the content viewing users via newsfeeds. Additionally or alternatively, the platform causes the user photo to be available for viewing by the content viewing users upon such content viewing users' navigation to a specific page including the user photo (e.g., the brand's page featuring the items associated with the user photo). At (10), subsequent to publishing the user photo, the platform (e.g., user reward module 122) detects a specified user action (e.g., sale, like, follow, forward, download, favorite, etc.) by one of the content viewing users in connection with the published association. The specified user action may be a sale of the brand owner's item that began with the content viewing user's viewing of the user photo uploaded by the content generating user, where the association between the brand owner's item and the user photo was requested by the content generating user and approved by the brand owner of the item. At (11), upon detection of such specified user action, the platform (e.g., user reward module 122) determines a user reward based on the detected user action by the contenting viewing user. At (12), upon determining the user reward, the platform provides the determined user reward to the content generating user. The reward can be a credit available for the content generating user to use on the platform.

Linking a User Photo to Multiple Pages Based on Approval of Link Requests

Figure 3A:
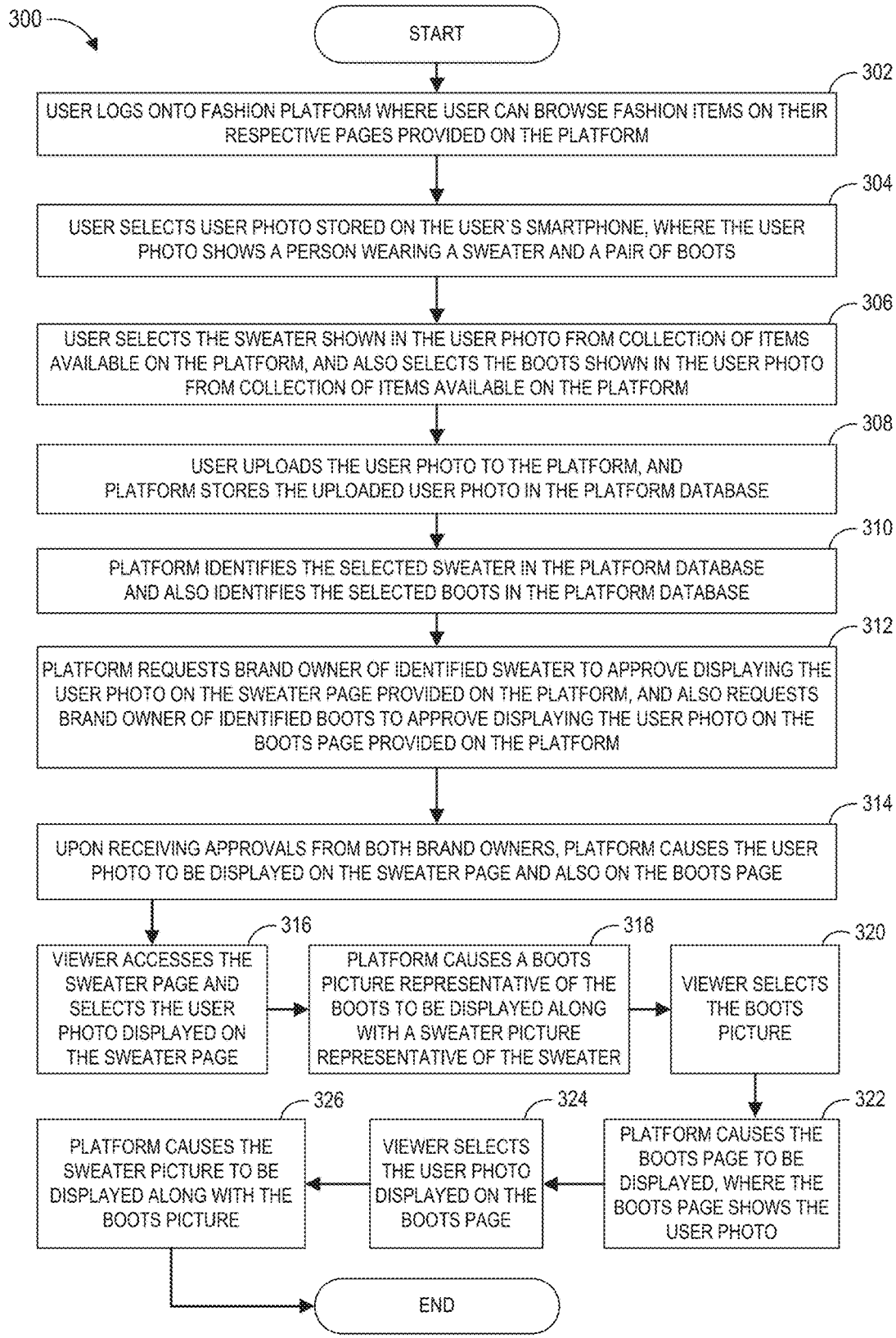
FIG. 3A illustrates a flowchart of linking a user photo to multiple pages based on approval of link requests in accordance with an embodiment.

As discussed herein, a user browsing a sweater, for example, on a clothing brand's website may wish to see photos showing how other people are wearing the sweater or photos showing with what other items other people are wearing the sweater. FIG. 3A is a flowchart of linking a user photo to multiple pages based on approval of link requests in accordance with an embodiment, such that the user can navigate from, for example, a sweater page to another page dedicated to a pair of boots via a user-uploaded photo depicting both the sweater and the pair of boots. The steps illustrated in FIG. 3A may be performed by the platform described herein with reference to FIGS. 1A, 1B, and 2, or any components therein, or any other system discussed herein or other devices within the scope of the present disclosure.

Logging Onto the Platform

At block 302, a user logs onto the platform, where the user can browse fashion items on the respective item pages provided on the platform. Logging onto the platform may involve the user providing user credentials (e.g., a user name and a password) via a user interface provided by the platform.

Selection of User Photo

The user may wish to share a photo with other users of the platform. In such a case, at block 304, the user selects a user photo stored on the user's smartphone, where the user photo features, for example, a person wearing a sweater and a pair of boots. The user may, while logged onto the platform, activate a user interface button for uploading a user photo. Upon user activation of such user interface button, the platform may provide a user interface for locating and selecting a user photo from the collection of photos stored on the user's smartphone. For example, the user photo may be a photo taken using the camera provided on the user's smartphone or a photo that is downloaded or otherwise stored onto the user's smartphone. Although the sweater and the boots are used for illustrative purposes, the techniques described herein can be extended to any other items.

Selecting Items Appearing in the User Photo

Upon receiving the user photo, the platform may present the user with a collection of items available on the platform. At block 306, the user selects the sweater shown in the user photo from the collection of items available on the platform, and also selects the boots shown in the user photo from the collection of items available on the platform. To facilitate selection of items, the platform, instead of presenting a list of items, may provide an item search user interface to the user for locating the desired item from the database of items registered on the platform (or identifying an item available on another platform external to the platform). In some embodiments, the platform may provide a list of item categories, and upon user selection of an item category, the platform may provide a list of brand owners associated with the selected item category, and upon user selection of a brand owner, the platform may provide a list of items matching the selected item category and the selected brand owner. Alternatively, the list of item categories may be presented upon user selection of a brand owner from a list of brand owners. In some embodiments, the list provided to the user may be a database of items searchable by the brand owner name, item type, item color, or other search parameters.

Generating Link Requests

Upon user selection of the sweater, the selected sweater is associated with the user photo, and a link request for linking the selected sweater and the user photo in the platform database is generated (e.g., for approval by the brand owner of the sweater). Similarly, upon user selection of the boots, the selected pair of boots is associated with the user photo, and a link request for linking the selected boots and the user photo in the platform database is generated (e.g., for approval by the brand owner of the boots). In some implementations, the selected sweater and the selected pair of boots are not associated with the user photo upon user selection, but associated with the user photo upon approval by the respective the brand owners. In some implementations, the link requests are generated after the user photo has been uploaded.

Uploading the User Photo and Creating a Database Entry for User Photo

After selecting the one or more items featured in the user photo, at block 308, the user uploads the user photo to the platform such that the user photo can be viewable by other users of the platform and/or published in association with the selected items. Upon receiving the user photo, the platform stores the uploaded user photo in the platform database. In response to detecting the uploaded user photo, the platform may create a database entry in the database maintained by the platform.

Content of Database Entry

Figure 1C:
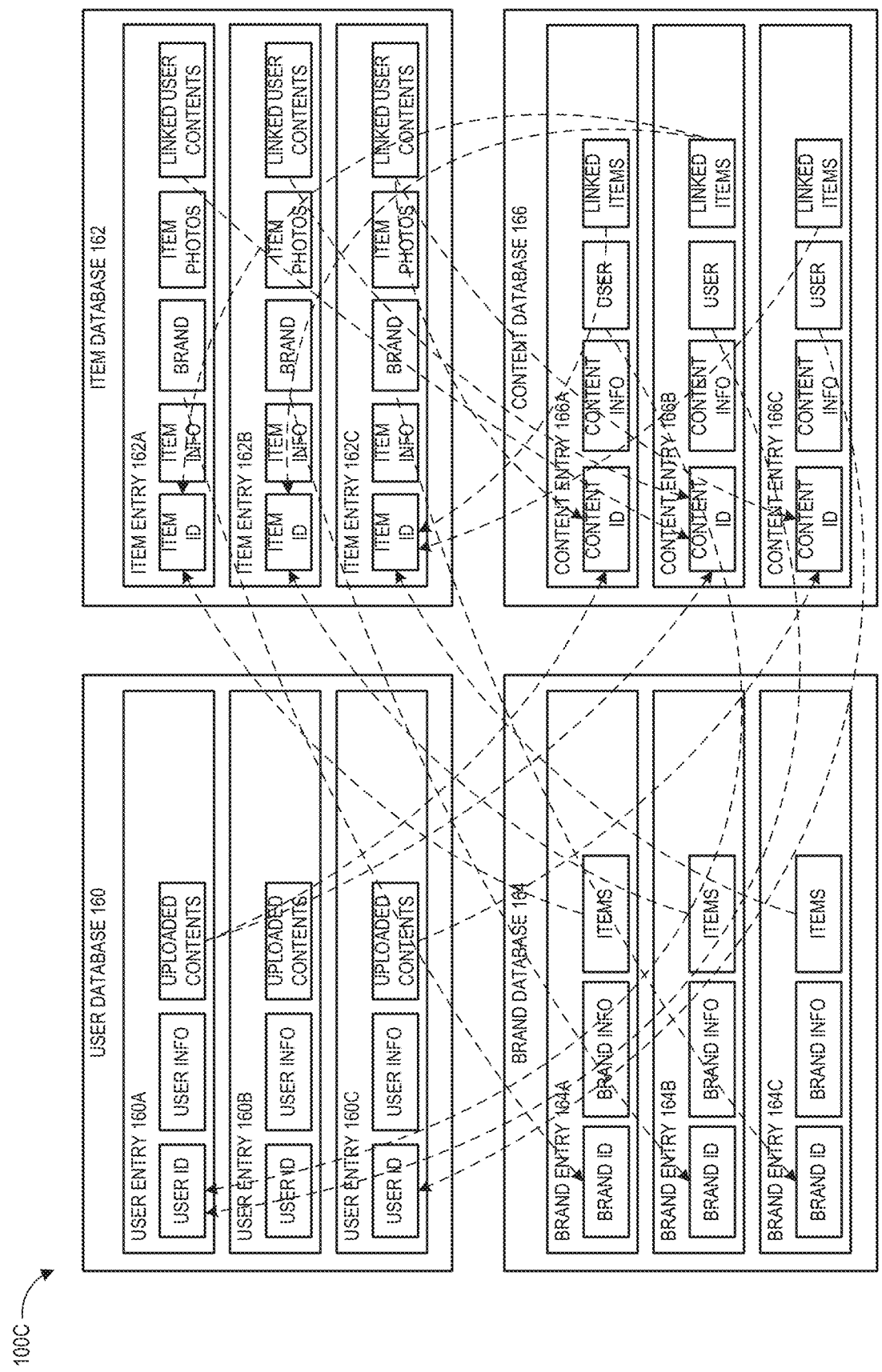
FIG. 1C illustrates a database structure of a network platform in accordance with an embodiment.

As shown in FIG. 1C, a database entry corresponding to a user photo may include a user photo identifier identifying the user photo and a user identifier identifying the user who uploaded the user photo. In embodiments, the database entry is updated, in response to a request to associate the user photo with one or more items (or brand approval of such a request), to include (i) a brand or brand identifier identifying the brand owner(s) associated with or linked to the user photo after a brand owner or an item of the brand owner is associated with or linked to the user photo, (ii) an item identifier identifying the item(s) associated with or linked to the user photo after an item is associated with or linked to the user photo, (iii) a location identifier identifying the location in which the user photo is stored after the user photo is stored at the location, (iv) an approved brand owner identifier identifying the brand owner(s) who has approved the user-requested associations or links with respect to the user photo after the platform receives approval from the brand owner(s), and/or (v) an approved item identifier identifying the item(s) whose associations have been approved by the brand owner(s) associated with the item(s) after the platform receives brand owner approval for the item(s).

Identifying the Items

At block 310, in response to receiving the uploading user's selection of the sweater and the boots, the platform identifies the selected sweater in the platform database and also identifies the selected boots in the platform database. For example, the user device may transmit the item identifiers of the selected sweater and boots to the platform, and the platform may identify the item entries corresponding to the sweater and the boots using the received item identifiers.

Requesting Brand Owner Approval

At block 312, upon receiving the uploading user's selection of the sweater and the boots, the platform requests the brand owner of the identified sweater to approve displaying the user photo on the sweater page provided on the platform, and also requests the brand owner of the identified boots to approve displaying the user photo on the boots page provided on the platform. For example, the platform may determine the brand identifiers corresponding to the sweater and the boots specified in the item entries corresponding to the sweater and the boots. The requests may be transmitted to the brand owners using the address information of the respective brand owners (e.g., specified in the brand entries identified using the determined brand identifiers). In some embodiments, the requests may be generated and placed within the platform (e.g., in the platform inbox), such that the requests are made visible to the brand owners the next time the brand owners log onto the platform. In some embodiments, a notification may be sent to the brand owner for each link request associated with an item of the brand owner.

Linking the User Photo to Approved Items

At block 314, upon receiving approvals from both of the brand owners, the platform causes the user photo to be displayed on the sweater page and also on the boots page. For example, the platform may modify the sweater page to include the user photo and also modify the boots page to include the user photo. In another example, the platform may update the database entry of the user photo to include a reference to the database entries of the sweater page and the boots page, respectively. In yet another example, the platform may update the database entry of the user photo to include a reference to the database entries of the sweater and the boots, respectively. In yet another example, the platform may update the database entry of the sweater page (or the sweater) to include a reference to the database entry of the user photo, and update the database entry of the boots page (or the boots) to include a reference to the database entry of the user photo. In embodiments, when the request to link the user photo to each item depicted in the user photo is approved by the corresponding brand owner, the platform may cause the user photo and the item content (e.g., a brand-uploaded picture representative of the particular item) to be displayed in the same screen (e.g., display screen of a user device). An example of such a screen configuration is described in greater detail below with reference to FIG. 3C.

Accessing the Sweater Page

Subsequent to linking of the user photo to the sweater, at block 316, a viewing user accesses the sweater page and selects the user photo displayed on the sweater page. To access the sweater page, the viewing user may have selected a picture of the sweater on a different page provided on the platform. In some embodiments, to access the sweater page, the viewing user may have selected the sweater from a collection of items presented to the viewing user by the platform. In other embodiments, to access the sweater page, the viewing user may have activated a link (e.g., a URL) from a location external to the platform.

Displaying Boots Picture Along with Sweater Picture

At block 318, in response to the viewing user's selection of the user photo displayed on the sweater page, the platform causes a boots picture representative of the boots to be displayed along with a sweater picture representative of the sweater to the viewing user (e.g., via the display screen of the viewing user's smartphone). The platform may cause the boots picture and the sweater picture to be displayed alongside the user photo uploaded by the user. An example of such a screen configuration is described in greater detail below with reference to FIG. 3C. In embodiments, the platform receives a content identifier associated with the user photo selected by the viewing user, and identifies the content entry corresponding to the selected user photo. Based on the identified content entry specifying the sweater (e.g., the item identifier associated with the sweater) and the boots (e.g., the item identifier associated with the boots), the platform identifies the item entries corresponding to the sweater and the boots and displays the sweater picture and the boots picture specified in the respective item entries.

Item Picture Representative of the Item

In embodiments, before an item is linked to a user photo uploaded by a user of the platform, the item may already be associated with an item content depicting the item. The item content may be a picture illustrating the item in an unworn state (e.g., the item by itself without any person wearing the item or the item with a person next to the item). For example, the item content can be a picture of the sweater in a white background. Alternatively, the item content may be a photo featuring a person wearing the item. Such item content may be uploaded and associated with the item by the brand owner of the item. In addition to such item content, a content generating user may request that the item be linked to (or associated with) a user photo featuring a person wearing the item.

User Selection of Boots Picture

Upon viewing the user photo (showing a person wearing the sweater and the boots) along with the sweater picture and the boots picture, the viewing user may wish to see how other people are wearing the boots. At block 320, the viewing user selects the boots picture from a screen displaying the boots picture along with the sweater picture and the user photo. An example of such a screen configuration is described in greater detail below with reference to FIG. 3C.

Displaying Boots Page Showing User Photo

At block 322, in response to the viewing user's selection of the boots picture from the screen displaying the boots picture along with the sweater picture and the user photo, the platform causes the boots page to be displayed, where the boots page shows the user photo. In some embodiments, the platform accesses a URL associated with the boots picture selected at block 320 and causes the content at the accessed URL to be displayed. In other embodiments, the platform determines an item ID or another parameter associated with the boots picture selected at block 320 and generates the boots page based on the determined ID or parameter. For example, the boots picture may be associated with an item ID of the boots stored in the platform database. The platform may access the database entry of the boots using the item ID, determine which user photos, descriptions, and other content are associated with the boots, and generate the boots page including such user photos, descriptions, and other content. As discussed herein, the boots page may include other user photos whose links to the boots were previously approved by the brand owner of the boots. The boots page may also include one or more photos of the boots uploaded by the brand owner. An example of such a screen configuration is described in greater detail below with reference to FIG. 3C.

User Selection of User Photo on Boots Page

Upon viewing the boots picture along with other user photos featuring the boots, the viewing user may wish to see the user photo again along with items worn by the person depicted in the user photo. At block 324, the viewing user selects, from the boots page displaying the boots picture along with the user photo, the user photo displayed along with the boots picture on the boots page. An example of such a boots page is described in greater detail below with reference to FIG. 3C.

Displaying Sweater Picture Along with Boots Picture

At block 326, in response to the viewing user's selection of the user photo displayed on the boots page, the platform causes the sweater picture to be displayed along with the boots picture to the viewing user. The platform may cause the boots picture and the sweater picture to be displayed alongside the user photo uploaded by the user. An example of such a screen configuration is described in greater detail below with reference to FIG. 3C. In embodiments, the platform receives a content identifier associated with the user photo selected by the viewing user, and identifies the content entry corresponding to the selected user photo. Based on the identified content entry specifying the sweater (e.g., the item identifier associated with the sweater) and the boots (e.g., the item identifier associated with the boots), the platform identifies the item entries corresponding to the sweater and the boots and displays the sweater picture and the boots picture specified in the respective item entries.

Providing Navigable Path Between Sweater Page and Boots Page Using User Photo

Figure 3B:
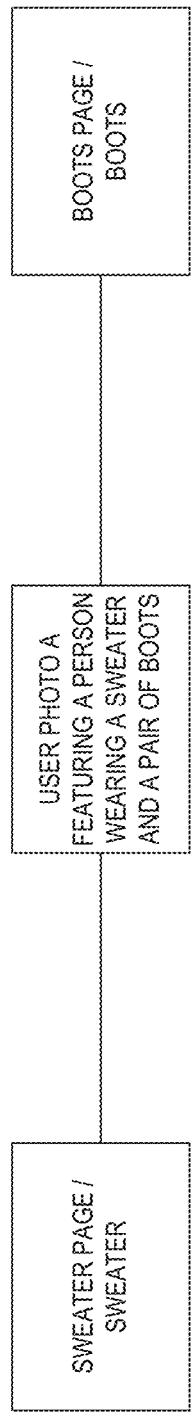
FIG. 3B illustrates a data structure including a user photo linked to a sweater and also to a pair of boots in accordance with an embodiment.

FIG. 3B illustrates linking between the database entry for the user photo and the database entries for the item pages or the items in the database of the platform. As shown in FIG. 3B, the user photo A featuring a person wearing the sweater and the boots is linked to the sweater page and/or the sweater in the platform database, and is also linked to the boots page and/or the boots in the platform database. In some embodiments, each link is created upon receipt of the link request approval from the corresponding brand owner (e.g., brand owner of the item requested to be linked to the user photo).

Navigation From Item Page to Photo Page

Figure 3C:
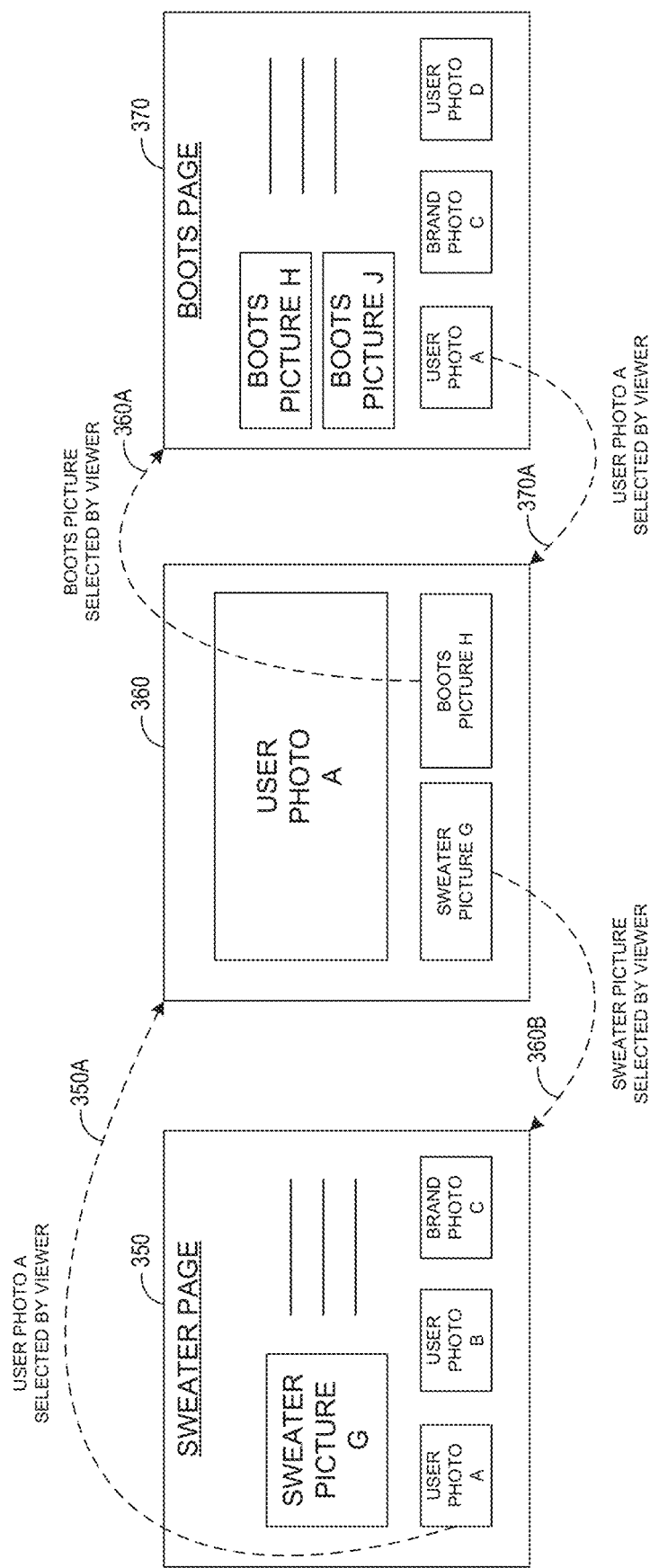
FIG. 3C illustrates navigation through two item pages via a user photo on the platform in accordance with an embodiment.

FIG. 3C illustrates navigation (enabled by the linking process described here) through two item pages on the platform via a user photo in accordance with an embodiment. As shown in FIG. 3C, sweater page 350 includes a sweater picture G (uploaded by the brand owner) along with a description of the sweater. The sweater page 350 further includes user photo A, user photo B, and brand photo C. As indicated by arrow 350A, upon user selection of the user photo A, page 360 is presented to the user. The page 360 includes the user photo A along with the sweater picture G and boots picture H. The presentation of sweater picture G and boots picture H alongside user photo A may indicate to the user viewing the page 350 that the sweater and the boots depicted in sweater picture G and boots picture H, respectively, correspond to the sweater and the boots worn by the person shown in user photo A. Although only two item pictures are shown on the page 360, the embodiments described herein are not limited as such, and any number of items can be linked to a given user photo and displayed alongside the user photo upon approval by the respective brand owners of the items.

Navigation From Photo Page to Another Item Page

Further, as indicated by arrow 360A of FIG. 3C, upon user selection of boots picture H, boots page 370 is presented to the user, where boots page 370 includes the boots pictures H and J along with a description of the boots. The boots page 360 further includes user photo A, brand photo C, and user photo D. As indicated by arrow 370A, upon user selection of the user photo A, the page 360 is presented to the user. As indicated by arrow 360B, upon user selection of the sweater picture G, the sweater page 350 is presented to the user.

"Go Back" Action

In embodiments, the viewing user's selection of a specific one of the user-uploaded photos triggers a "go back" action (e.g., on the viewing user's web browser or mobile application) while the viewing user's selection of any of the remaining user-uploaded photos (other than the specific one) triggers causes a new page associated with the selected user-uploaded photo to be displayed. Such specific one of the user-uploaded photos may be displayed in the initial position among the user-uploaded photos, in the last position among the user-uploaded photos, or at a position other than the first or last position. Similarly, the viewing user's selection of a specific one of the item photos triggers a "go back" action (e.g., on the viewing user's web browser or mobile application) while the viewing user's selection of any of the remaining item photos (other than the specific one) triggers causes a new page associated with the selected item photo to be displayed. Such specific one of the item photos may be displayed in the initial position among the item photos, in the last position among the item photos, or at a position other than the first or last position. For example, after arrow 350A, the viewing user's selection of the sweater picture G may trigger a "go back" action to cause the sweater page 350 to be displayed, whereas the viewing user's selection of the boots picture H may causes the boots page 370 to be created. Alternatively, regardless of whether the viewing user arrived at page 360 via arrow 350A or 370A, the viewing user's selection of the sweater picture G or the boots picture H causes the sweater page 350 or the boots page 370 to be created without triggering a "go back" action.

Displaying Items Linked to a Selected User Photo

Figure 4A:
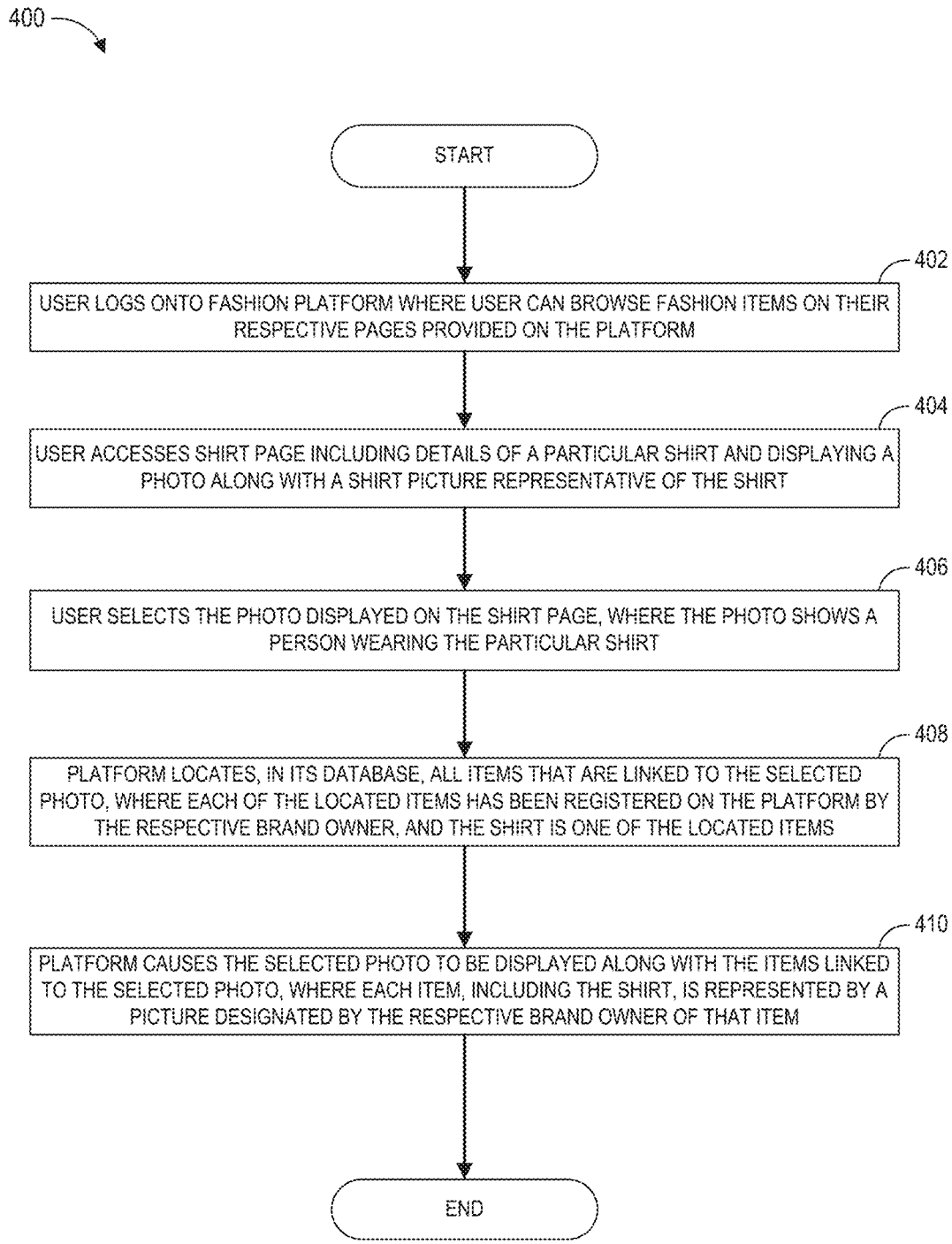
FIG. 4A illustrates a flowchart of displaying items linked to a selected user photo in accordance with an embodiment.

As discussed herein, a user photo showing a person wearing a sweater and a pair of boots can be linked to the sweater and the pair of boots in the database of the platform. When a viewing user accesses such a user photo (e.g., because the viewing user found the user photo interesting and wanted to learn more about the items worn by the person depicted in the user photo), the platform causes the user photo to be displayed alongside the sweater picture and the boots picture based on the linking between the user photo and the sweater and the boots in the database of the platform. FIG. 4A is a flowchart of displaying items linked to such a user photo in accordance with an embodiment. The steps illustrated in FIG. 4A may be performed by the platform described herein with reference to FIGS. 1A, 1B, and 2, or any components therein, or any other system discussed herein or other devices within the scope of the present disclosure. Block 402 may be identical or similar to the process described in connection with block 302 of FIG. 3A.

Accessing a Shirt Page on the Platform

A viewing user logged onto the platform may be looking for a new shirt. At block 404, using the user interface provided by the platform, the user accesses a shirt page including details of a particular shirt and displaying a photo along with a shirt picture representative of the shirt. For example, the shirt picture may be a picture showing the shirt in an unworn state. The shirt picture may have been designated by the brand owner of the shirt. Although a shirt is used in the example of FIG. 4A, the embodiments of the present disclosure are not limited as such, and the techniques described in connection with the example of FIG. 4A can be extended to other items, and techniques described in connection with embodiments involving any item(s) can be applied to the embodiments described with reference to any other item(s).

Selecting the Photo Displayed on the Shirt Page

At block 406, the user selects the photo displayed on the shirt page, where the photo shows a person wearing the particular shirt. An example of such a screen configuration is described in greater detail below with reference to FIG. 4C.

Locating All Items Linked to Selected Photo

At block 408, in response to the viewing user's selection of the photo displayed on the shirt page, the platform locates, in the platform database, all items that are linked to the selected photo, where each of the located items has been registered on the platform by the respective brand owner of the item. The located items also include the shirt depicted in the selected photo.

Displaying All Linked Items Along with Selected Photo

At block 410, upon identifying the one or more items linked, in the database of the platform, to the selected photo, the platform causes the selected photo to be displayed along with the items linked to the selected photo, where each item, including the shirt, is represented by a picture designated by the respective brand owner of that item. For example, in response to the user selection of the photo, the platform determines whether the selected photo is linked in the platform database to any items and cause each of the items linked to the user photo to be displayed along with the selected photo. Further, when generating the item page for a given item, the platform may determine whether the item is linked in the platform database to any user photos and cause each of the user photos linked to the item to be displayed on the item page.

Providing Navigable Path Among Multiple Item Pages Using User Photo

Figure 4B:
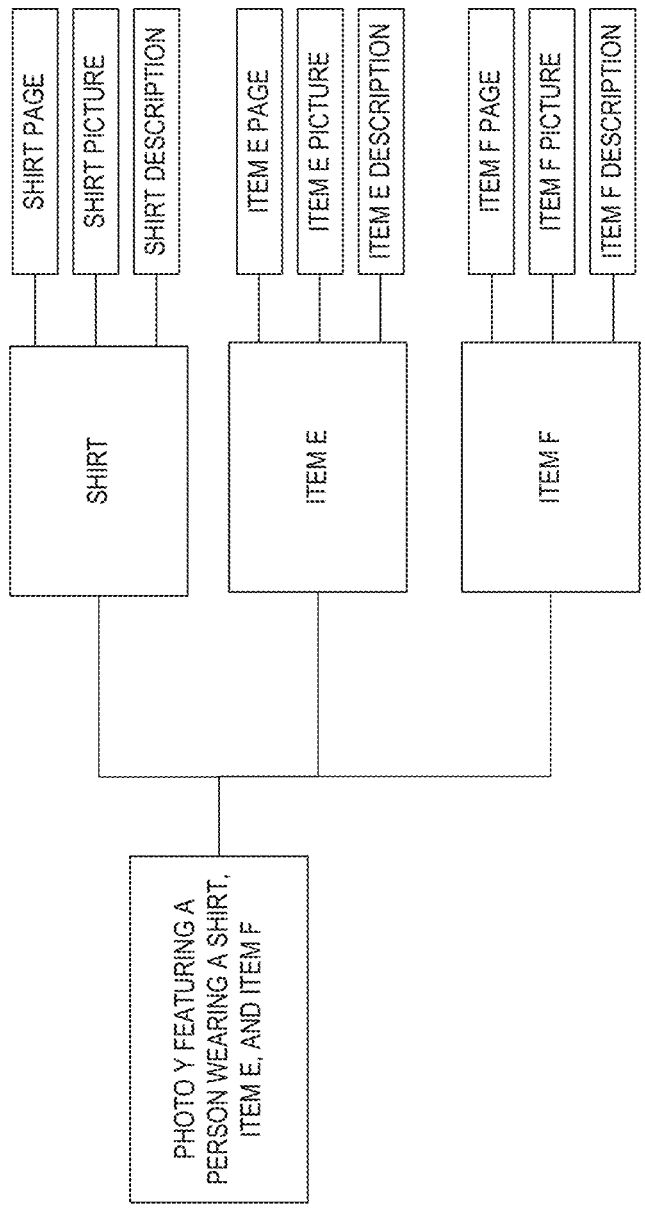
FIG. 4B illustrates a data structure including a user photo linked to multiple items available on the platform in accordance with an embodiment.

FIG. 4B illustrates linking between the database entry for the user photo and the database entries for the item pages or the items in the database of the platform. As shown in FIG. 4B, the user photo Y featuring a person wearing a shirt, item E, and item F is linked to the database entry for the shirt, to the database entry for item E, and to the database entry for item F. Further, as shown in FIG. 4B, the shirt, item E, and item F are each associated with a page, a picture, and a description. In some embodiments, all items linked to a given user photo each have a corresponding item page on the platform, where the item page provides details regarding the item. In other embodiments, some of the items linked to the user photo have corresponding item pages on the platform but the remaining items do not have any corresponding pages on the platform. In some embodiments, specific association between the items and the corresponding pages are not created in the platform database, and the platform generates, upon user request, the item page corresponding to a given item based on the objects linked to the given item in the platform database. In one example, the database entry for the shirt may not include a specific reference to the shirt page as shown in FIG. 4B, and the platform may generate the shirt page based on the shirt picture, the shirt description, and any photos (including photo Y) linked to the shirt in the platform database.

Providing Navigable Path Among Multiple Unrelated Items or Pages

In some implementations, multiple items or multiple pages that are otherwise unrelated may be linked such that a navigable path is created among the multiple items or pages. For example, in some cases, the uploading user may request that a user photo be associated with one or more items that are not depicted in the user photo.

Navigation from Shirt Page to Photo Page

Figure 4C:
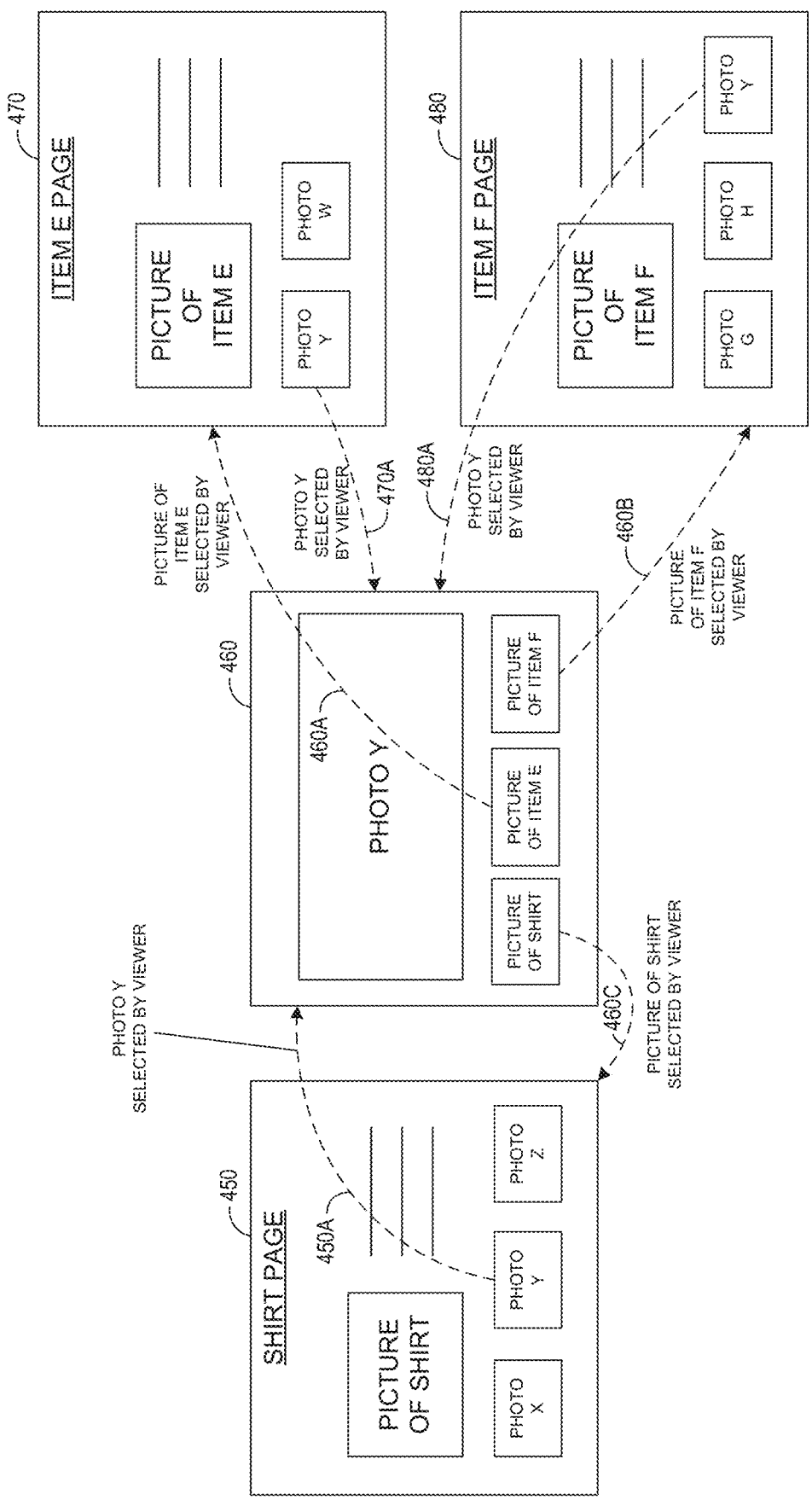
FIG. 4C illustrates navigation through multiple items pages via a user photo in accordance with an embodiment.

FIG. 4C illustrates navigation through multiple item pages on the platform via a user photo in accordance with an embodiment. As shown in FIG. 4C, shirt page 450 includes a picture of the shirt along with a description of the shirt. The shirt page 450 further includes photos X, Y, and Z. As indicated by arrow 450A, upon the viewing user's selection of photo Y, page 460 is presented to the viewing user. The page 460 includes photo Y along with the picture of the shirt, the picture of item E, and the picture of item F. The presentation of the pictures of the shirt, item E, and item F alongside photo Y may indicate to the user viewing the page 450 that the shirt, item E, and item F depicted in the respective pictures correspond to the shirt, item E, and item F worn by the person(s) shown in photo Y. Although only three item pictures are shown on the page 460, the embodiments described herein are not limited as such, and any number of items can be linked to a given photo and displayed alongside the photo upon approval by the respective brand owners of the items.

Navigation from Photo Page to Other Item Pages

Further, as indicated by arrow 460A, upon the viewing user's selection of the picture of item E, item E page 470 is presented to the viewing user. The item E page 470 includes a picture of item E along with a description of item E and photos Y and W. As indicated by arrow 470A, upon the viewing user's selection of photo Y displayed on the item E page 470, page 460 is displayed to the viewing user. As indicated by arrow 460B, upon the viewing user's selection of the picture of item F, item F page 480 is presented to the viewing user. The item F page 480 includes a picture of item F along with a description of item F and photos G, H, and Y. As indicated by arrow 480A, upon the viewing user's selection of photo Y displayed on the item F page 480, page 460 is displayed to the viewing user. As indicated by arrow 460C, upon the viewing user's selection of the picture of the shirt displayed on the page 460 displaying photo Y, the shirt page 450 is presented to the viewing user.

Requesting a New Brand or a New Item to be Linked with User Photo

Figure 5A:
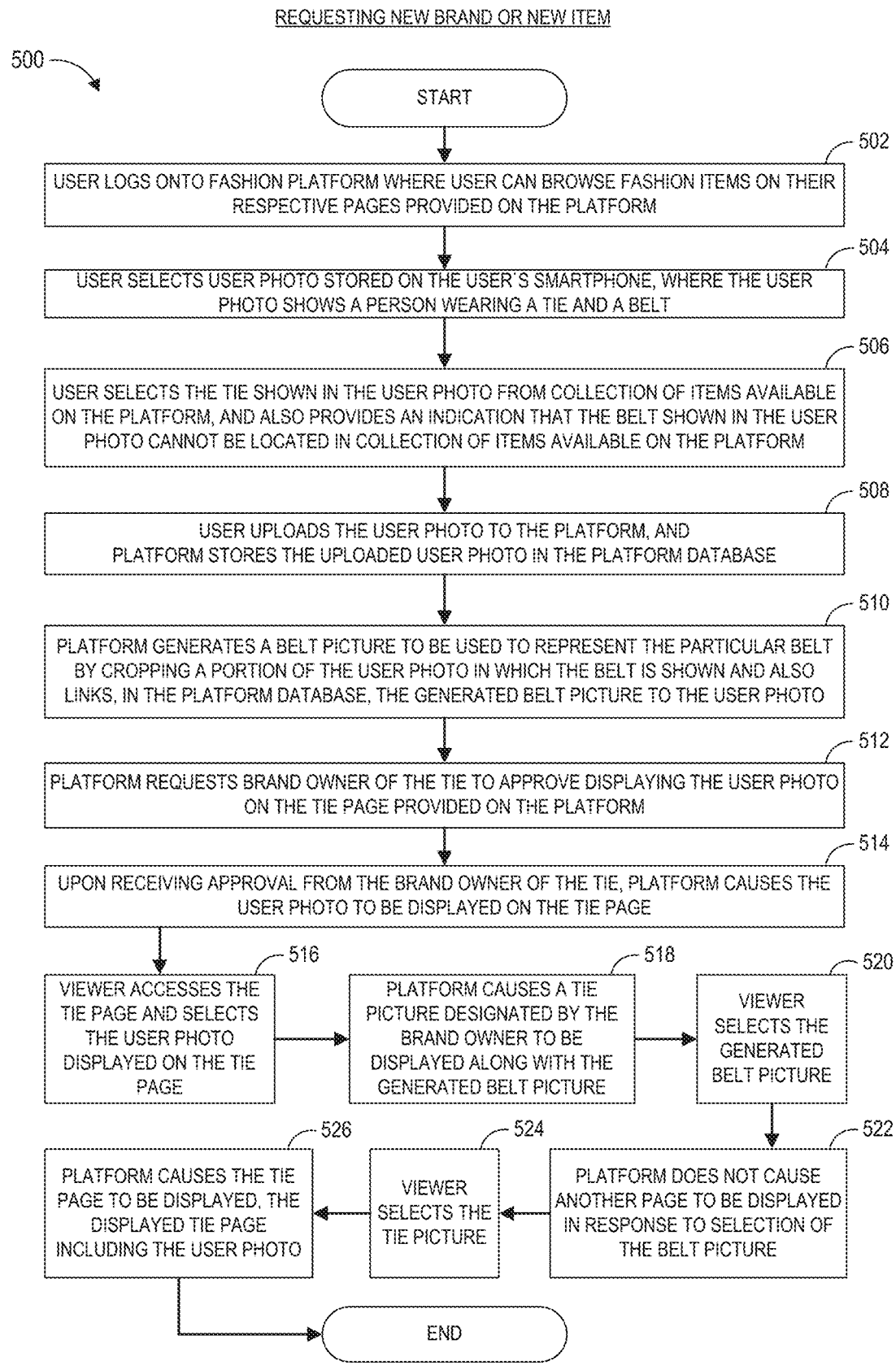
FIG. 5A illustrates a flowchart of requesting a new brand or a new item on the platform in accordance with an embodiment.
Figure 6A:
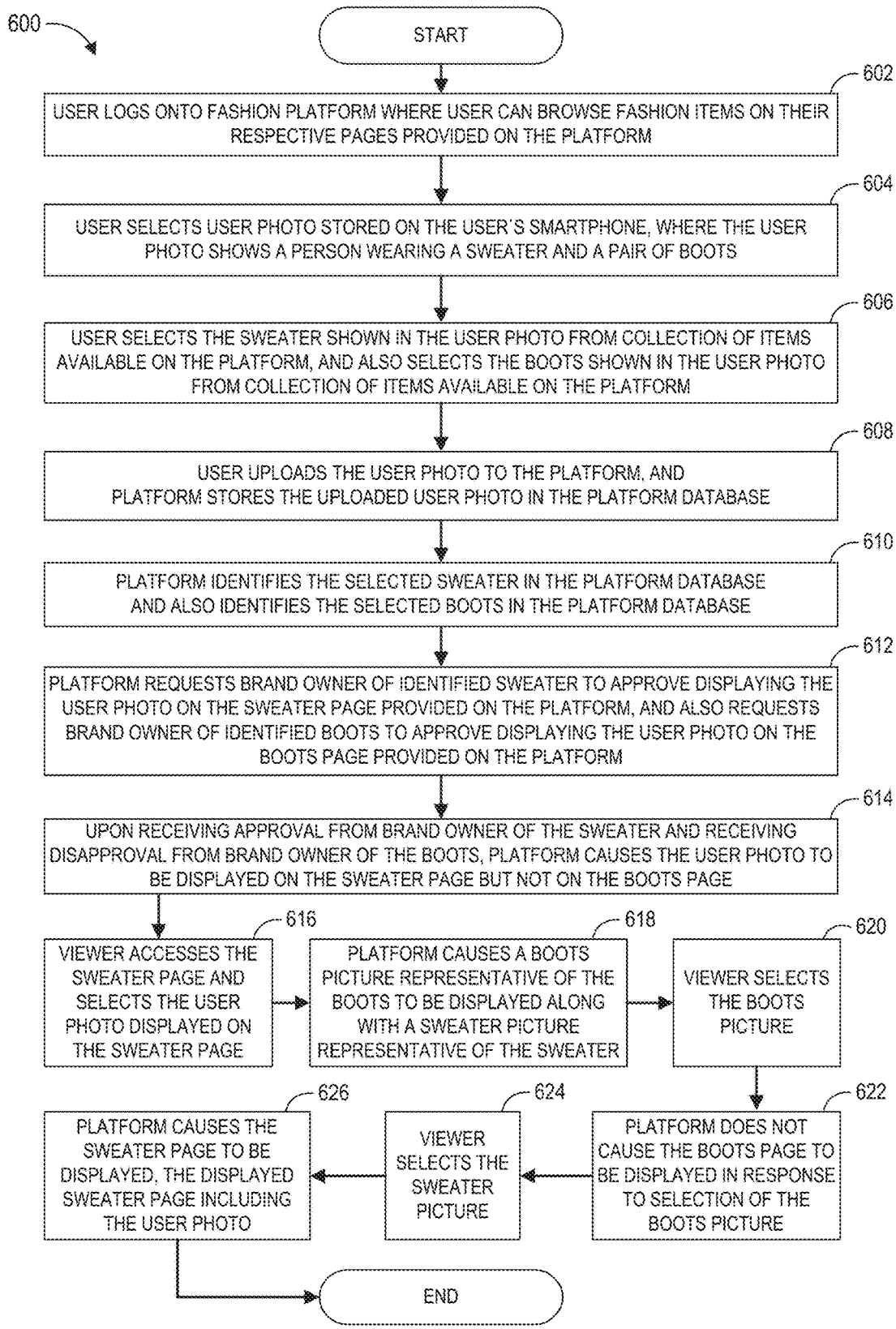
FIG. 6A illustrates a flowchart of displaying approved items and disapproved items side by side in accordance with an embodiment.

In some cases, the item that an uploading user wishes to associate with a user photo may not be available on the platform (e.g., the item may not have a corresponding entry in the item database 162). FIG. 5A is a flowchart of requesting a new brand or a new item on the platform in such cases, in accordance with an embodiment. The steps illustrated in FIG. 5A may be performed by the platform described herein with reference to FIGS. 1A, 1B, and 2, or any components therein, or any other system discussed herein or other devices within the scope of the present disclosure. Block 502 may be identical or similar to the process described in connection with block 302 of FIG. 3A.

Selection of User Photo

A user may wish to share a photo with other users of the platform. To do so, at block 504, the user selects a user photo stored on the user's smartphone, where the user photo features a person wearing a tie and a belt. For example, the user photo may be a photo taken using the camera provided on the user's smartphone, where the photo shows the user wearing the tie and the belt. The user may, while logged onto the platform, activate a user interface button for uploading a user photo. Upon user activation of such user interface button, the platform may provide a user interface for locating and selecting a user photo from the collection of photos stored on the user's smartphone. Although the tie and the belt are used for illustrative purposes, the techniques described herein can be extended to any other items.

Generation of Link Requests

Upon receiving the user photo, the platform may present the user with a collection of items available on the platform. For example, the user may learn that the collection of items includes the tie but not the belt. In such a case, at block 506, the user selects the tie shown in the user photo from the collection of items available on the platform, and also provides an indication to the platform that the belt shown in the user photo cannot be located in the collection of items available on the platform. For example, upon determining that the belt cannot be located in the platform database, the user may activate a user interface button to indicate to the platform that the belt or the brand owner of the belt has not yet registered the belt or the brand on the platform. Based on such indication, the platform associates the selected tie with the user photo, and generates a link request for linking the selected tie and the user photo in the platform database (e.g., for approval by the brand owner of the tie), but refrains from generating a link request for linking the belt to the user photo. In some embodiments, even though a link request is not generated by the platform, the user photo is associated with the belt based on additional information provided by the user (e.g., name, brand, and other details of the belt).

Uploading the User Photo and Creating a Database Entry for User Photo

At block 508, the user uploads the user photo to the platform, and the platform stores the uploaded user photo in the platform database. In response to detecting the uploaded user photo, the platform may create a database entry in the database maintained by the platform as discussed herein.

Generating Item Picture for Unavailable Item

Figure 5B:
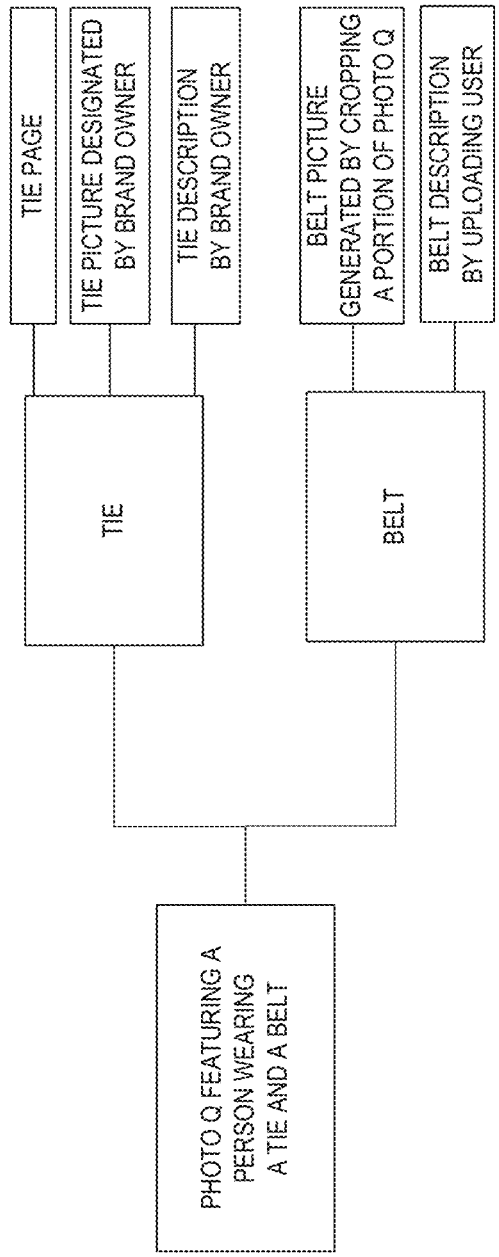
FIG. 5B illustrates a data structure including a user photo linked to an item that is available on the platform and also to another item that is not available on the platform in accordance with an embodiment.

At block 510, in response to the uploading user's indication that the belt shown in the user photo cannot be located in the collection of items available on the platform, the platform generates a belt picture to be used to represent the particular belt by cropping a portion of the user photo in which the belt is shown, and also links, in the platform database, the generated belt picture to the user photo. An example data structure is shown in FIG. 5B. In some embodiments, the user identifies the location within the user photo in which the belt is shown. In other embodiments, the platform automatically detects the belt (and/or any other items prior to or after selection of such items) in the user photo. The cropped belt photo may be stored in the platform database in association with the belt. Alternatively, upon receiving an indication that the belt is not available on the platform (or as a default option without receiving such an indication), the platform may prompt the user to provide a belt picture or a link to a belt picture that can be used to represent the particular belt.

Requesting Brand Owner Approval for Available Item

At block 512, in response to the uploading user's request to associate the user photo with the tie, the platform requests the brand owner of the identified tie to approve displaying the user photo on the tie page provided on the platform but does not provide a similar request for the belt.

Linking the User Photo to Approved Available Items

At block 514, upon receiving approval from the brand owner of the tie, the platform causes the user photo to be displayed on the tie page but not on the boots page. An example of such a screen configuration is described in greater detail below with reference to FIG. 5C.

Accessing the Tie Page

At block 516, a viewing user accesses the tie page and selects the user photo displayed on the tie page. To access the tie page, the viewing user may have selected a picture of the tie on a different page provided on the platform. In some embodiments, to access the tie page, the viewing user may have selected the tie from a collection of items presented to the viewing user by the platform. In other embodiments, to access the tie page, the viewing user may have activated a link (e.g., a URL) from a location external to the platform.

Displaying Cropped Belt Picture Along with Brand-Designated Tie Picture

At block 518, in response to the viewing user's selection of the user photo displayed on the tie page, the platform causes the cropped belt picture representative of the belt to be displayed along with a tie picture designated by the brand owner of the tie to the viewing user (e.g., via the display screen of the viewing user's smartphone). The platform may cause the cropped belt picture and the brand-designated tie picture to be displayed alongside the user photo uploaded by the user. An example of such a screen configuration is described in greater detail below with reference to FIG. 5C.

User Selection of Cropped Belt Picture

At block 520, the viewing user selects the cropped belt picture from a screen displaying the cropped belt picture along with the brand-designated tie picture and the user photo. An example of such a screen configuration is described in greater detail below with reference to FIG. 5C.

Displaying Belt Page Showing User Photo

At block 522, in response to the viewing user's selection of the cropped belt picture from the screen displaying the cropped belt picture along with the brand-designated tie picture and the user photo, the platform does not cause another page (e.g., the belt page) to be displayed. For example, in response to the viewing user's selection of the cropped belt picture from the screen displaying the cropped belt picture along with the brand-designated tie picture and the user photo, the platform may cause the same screen to continue to be displayed to the viewing user. the An example of such a screen configuration is described in greater detail below with reference to FIG. 5C.

User Selection of Brand-Designated Tie Picture

At block 524, the viewing user selects the brand-designated tie picture displayed along with the cropped belt picture and the user photo. An example of such a belt page is described in greater detail below with reference to FIG. 5C.

Displaying Tie Picture Along with Belt Picture

At block 526, in response to the viewing user's selection of the brand-designated tie picture displayed along with the cropped belt picture and the user photo, the platform causes the tie page to be displayed along with the user photo. An example of such a screen configuration is described in greater detail below with reference to FIG. 5C.

Linking Photo Featuring Item Unavailable on the Platform

FIG. 5B illustrates linking between the database entry for the user photo and the database entry for an item unavailable in the database of the platform. The user photo Q featuring a person wearing a tie and a belt is linked to the database entry for the tie and the database entry for the belt. The tie is linked, in the platform database, to the tie page, the tie picture designated by the brand owner of the tie, and the tie description provided by the brand owner. In contrast, the belt is not linked to its own dedicated page on the platform but the belt is linked, in the platform database, to the belt picture generated by cropping a portion of the user photo Q and the belt description provided by the uploading user (e.g., the user who uploaded the user photo Q onto the platform). The user photo Q is linked to the tie available on the platform and the belt not available on the platform. In some embodiments, the belt may be linked to its brand owner if the brand owner is registered on the platform (e.g., the item entry may be created for the belt and caused to refer to the brand identifier corresponding to the brand owner of the belt). In other embodiments, neither the belt nor the brand owner of the belt is registered on the platform, and the belt is linked to neither a dedicated page provided on the platform nor a brand owner of the belt.

Navigation from Tie Page to Photo Page

Figure 5C:
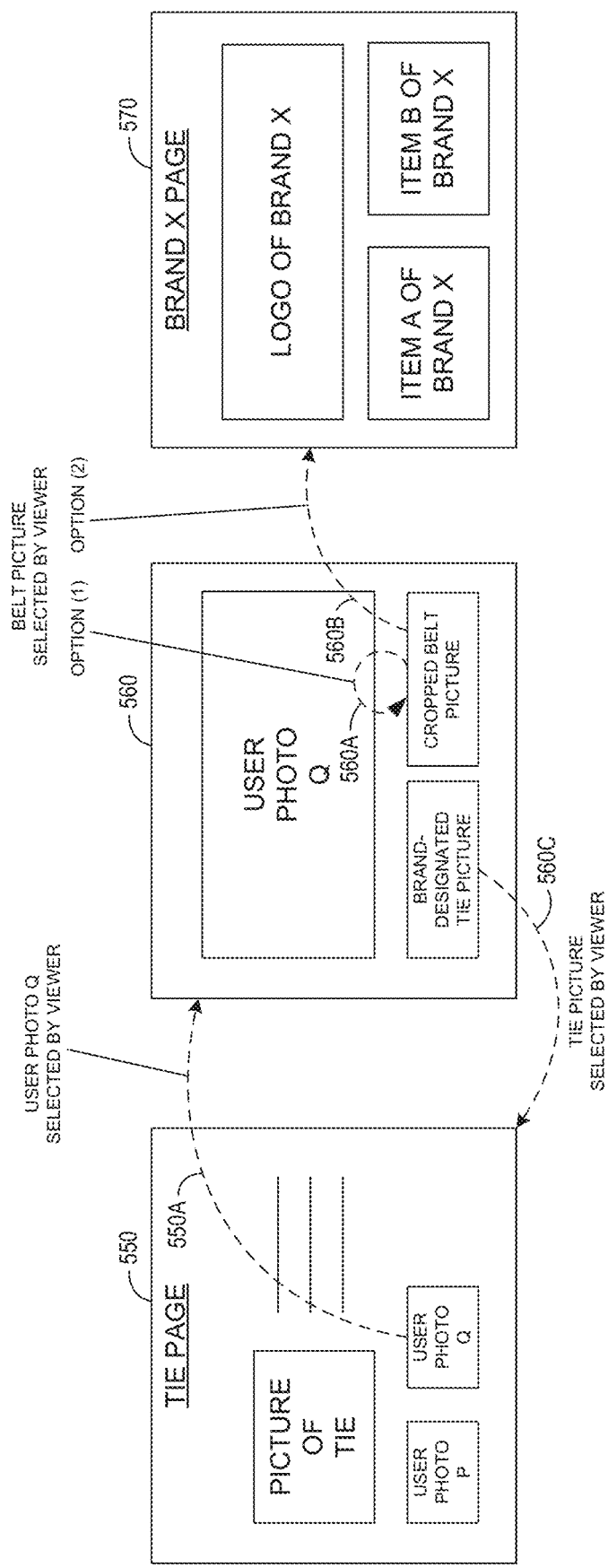
FIG. 5C illustrates navigation to and from an item page including a user photo featuring an item that is not available on the platform in accordance with an embodiment.

FIG. 5C illustrates navigation to and from an item page including a user photo featuring an item that is not available on the platform in accordance with an embodiment. As shown in FIG. 5C, tie page 550 includes a picture of the tie along with a description of the tie. The shirt page 550 further includes user photos P and Q. As indicated by arrow 550A, upon user selection of user photo Q, page 560 is presented to the user. The page 560 includes user photo Q along with the brand-designated tie picture and the cropped belt picture. The presentation of the brand-designated tie picture and the cropped belt picture alongside user photo Q may indicate to the user viewing the page 550 that the tie and the belt depicted in the respective item pictures correspond to the tie and the belt worn by the person(s) shown in user photo Q. Although only two item pictures are shown on the page 560, the embodiments described herein are not limited as such, and any number of items, regardless of whether the item is available on the platform, can be linked to a given photo and displayed alongside the photo upon approval by the respective brand owners of the items. In some embodiments, only items that are available on the platform can be linked to a given user photo. In some embodiments, only items that each have its dedicated page on the platform can be linked to a given user photo. In some embodiments, any number of items, regardless of whether the item has a dedicated page on the platform, can be linked to a given photo.

Navigation from Photo Page to Other Item Pages

Further, as indicated by arrow 560A, upon user selection of the picture of the cropped belt picture, page 560 may continue to be presented to the user, for example, since the belt does not correspond to any item available in the item database of the platform. Alternatively, as indicated by arrow 560B, upon user selection of the picture of the cropped belt picture, page 570 including information about the brand or brand owner of the belt may be presented to the user. As shown in FIG. 5C, page 570 may include information about the brand owner of the belt (e.g., "Brand X") and/or other items of the brand owner. In embodiments, page 570 may be a default or predefined page on the platform that is unrelated to the belt or the brand owner of the belt. In embodiments, page 570 may be a page external to the platform (e.g., having a different domain name than the platform). As indicated by arrow 560C, upon user selection of the brand-designated tie picture displayed along with the user photo Q and the cropped belt picture on page 560, the tie page 550 is presented to the user.

Displaying Approved Items and Disapproved Items Side-by-Side

In some cases, one brand may approve the user-requested association between a user photo and one of their products, and another brand may not approve the user-requested association between the user photo and one of their products. For example, the user photo may depict a sweater in a favorable light while depicting a watch in an unfavorable light, and the brand owner of the sweater may approve the association between the user photo and their sweater, but the brand owner of the watch may not approve the association between the user photo and their watch. FIG. 6A is a flowchart of displaying approved items and disapproved items side by side in such cases, in accordance with an embodiment. The steps illustrated in FIG. 6A may be performed by the platform described herein with reference to FIGS. 1A, 1B, and 2, or any components therein, or any other system discussed herein or other devices within the scope of the present disclosure. Blocks 602-612 may be identical or similar to the process described in connection with blocks 302-312 of FIG. 3A.

Receiving Approval and Disapproval from Brand Owners

At block 614, upon receiving approval from the brand owner of the sweater and receiving disapproval from the brand owner of the boots, the platform causes the user photo to be displayed on the sweater page but not on the boots page. An example of such a screen configuration is described in greater detail below with reference to FIG. 6C.

Accessing the Sweater Page

At block 616, a viewing user accesses the sweater page and selects the user photo displayed on the sweater page. To access the sweater page, the viewing user may have selected a picture of the sweater on a different page provided on the platform. In some embodiments, to access the sweater page, the viewing user may have selected the sweater from a collection of items presented to the viewing user by the platform. In other embodiments, to access the sweater page, the viewing user may have activated a link (e.g., a URL) from a location external to the platform.

Displaying Boots Picture Along with Sweater Picture

At block 618, in response to the viewing user's selection of the user photo displayed on the sweater page, the platform causes a boots picture representative of the boots to be displayed along with a sweater picture representative of the sweater to the viewing user (e.g., via the display screen of the viewing user's smartphone). The platform may cause the boots picture and the sweater picture to be displayed alongside the user photo uploaded by the user. An example of such a screen configuration is described in greater detail below with reference to FIG. 6C.

User Selection of Boots Picture

At block 620, the viewing user selects the boots picture from a screen displaying the boots picture along with the sweater picture and the user photo. An example of such a screen configuration is described in greater detail below with reference to FIG. 6C.

Refraining from Presenting Boots Page

At block 622, in response to the viewing user's selection of the boots picture from the screen displaying the boots picture along with the sweater picture and the user photo, the platform does not cause the boots page to be displayed in response to the user selection of the boots picture. For example, the platform does not cause the screen to be redirected to any other page in response to the user selection of the boots picture. The platform may continue to display the boots picture along with the sweater picture and the user photo depicting the boots and the sweater. An example of such a screen configuration is described in greater detail below with reference to FIG. 6C.

User Selection of Sweater Picture

At block 624, the viewing user selects the sweater picture from a screen that includes the sweater picture, the boots picture, and the user photo depicting the boots and the sweater. An example of such a boots page is described in greater detail below with reference to FIG. 6C.

Displaying Sweater Page Along with User Photo

At block 626, in response to the viewing user's selection of the sweater picture from the screen that includes the sweater picture, the boots picture, and the user photo depicting the boots and the sweater, the platform causes the sweater page to be displayed to the viewing user, where the displayed sweater page includes the user photo. An example of such a screen configuration is described in greater detail below with reference to FIG. 6C.

Linking User Photo to an Approved Item and an Unapproved Item

Figure 6B:
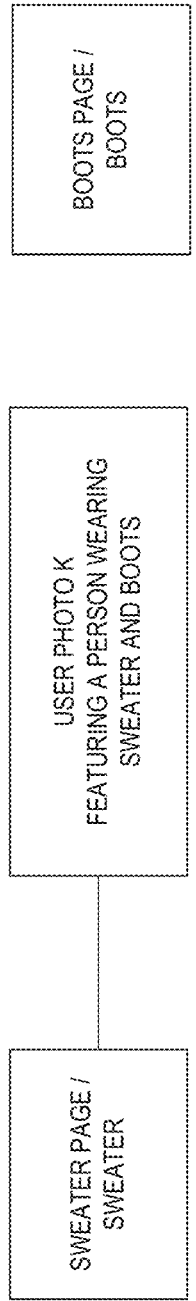
FIG. 6B illustrates a data structure including a user photo linked to an item whose link request is approved by its brand owner and not to another item whose link request is declined by its brand owner in accordance with an embodiment.
Figure 7D:

FIG. 6B illustrates linking of a user photo to a photo featuring an item approved by its brand owner and to another item not approved by its brand owner in accordance with an embodiment. The user photo K featuring a person wearing a sweater and a pair of boots is linked to the database entry for the sweater page and/or the sweater but not to the database entry for the boots page and/or the boots. In some embodiments, the lack of a link between the user photo K and the boots page and/or the boots in the platform database indicates that the link request has been denied by the brand owner of the boots. In other embodiments, the lack of a link between the user photo K and the boots page and/or the boots in the platform database indicates either that the link request for the boots has not yet been answered by the brand owner of the boots or that the link request has been denied by the brand owner of the boots.

Navigation from Sweater Page to Photo Page

Figure 6C:
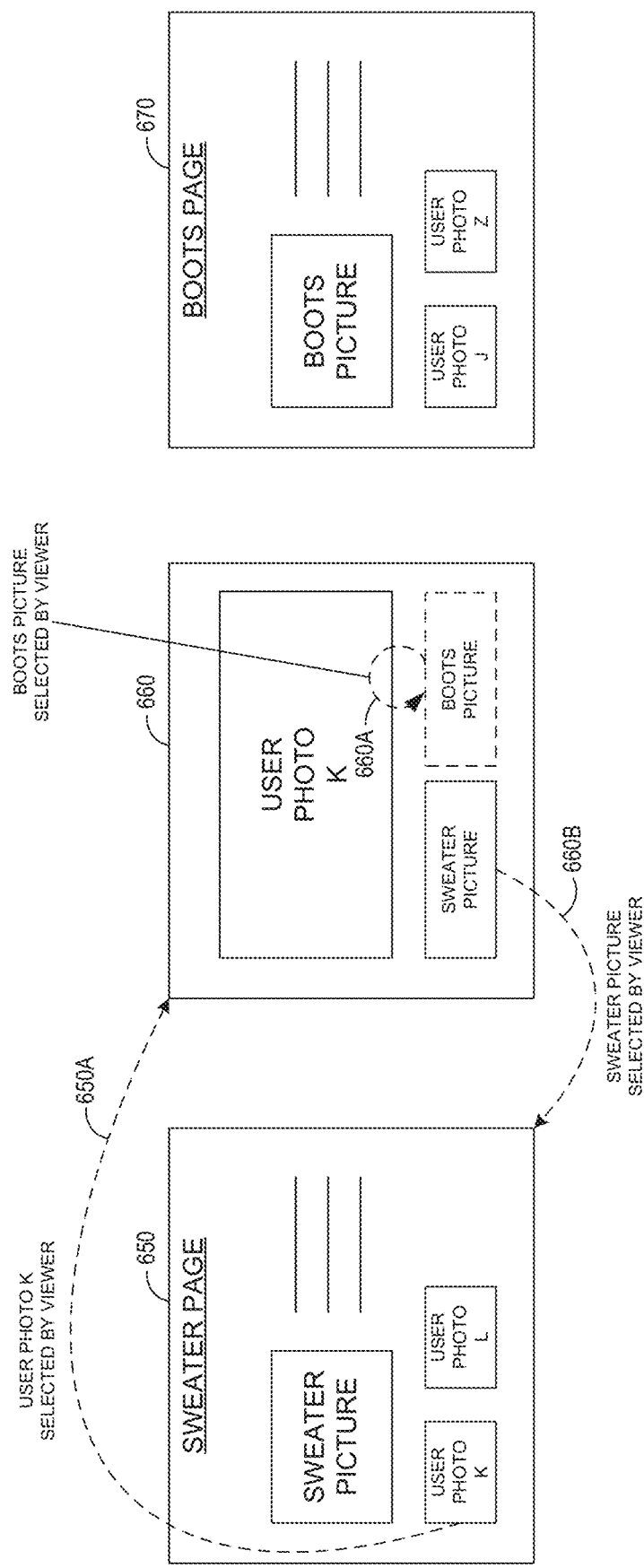
FIG. 6C illustrates navigation through an item page for an approved item and an item page for an unapproved item in accordance with an embodiment.

FIG. 6C illustrates navigation to and from an item page including a user photo featuring an item whose link request with respect to the user photo has been approved by the brand owner and another item whose link request with respect to the user photo has been denied by the brand owner, in accordance with an embodiment. As shown in FIG. 6C, sweater page 650 includes a sweater picture along with a description of the sweater. The sweater page 650 further includes user photos K and L. As indicated by arrow 650A, upon user selection of user photo K, page 660 is presented to the user. The page 660 includes user photo K along with the sweater picture and the boots picture. In some embodiments, the boots picture is omitted from page 660 based on the denial (by the brand owner of the boots) of the link request with respect to the user photo K. The presentation of the sweater picture and the boots picture alongside user photo K may indicate to the user viewing the page 650 that the sweater and the boots depicted in the respective pictures correspond to the sweater and the boots worn by the person(s) shown in user photo K. Although only two item pictures are shown on the page 660, the embodiments described herein are not limited as such, and any number of items, regardless of whether the link request with respect to the item is approved by the brand owner of the item, can be displayed alongside the photo on a photo page such as page 660. In some of such embodiments, the user photo whose link request with respect to an item has been denied by the brand owner of the item is not displayed on the item page corresponding to the item (e.g., as shown on page 670). In some embodiments, only items whose link request with respect to the user photo has been approved by the brand owner of the item are displayed alongside the user photo on a photo page such as page 660.

Navigation from Photo Page to Other Item Pages

Further, as indicated by arrow 660A, upon user selection of the boots picture provided along with the user photo K and the sweater picture on page 660, page 660 continues to be presented to the user. In the example of FIG. 6C, there is no navigable path from the sweater page 650 to the boots page 670, and no navigable path from the page 660 to the boots page 670. Further, the boots page 670 does not include the user photo K, which was previously requested by the user to be linked to the boots. As indicated by arrow 660B, upon user selection of the sweater picture provided along with the user photo K and the boots picture on page 660, the sweater page 650 is presented to the user.

User Interface Examples

FIGS. 7A-7M illustrate pages presented via a user device in accordance with an embodiment. Page 700A shows user photos uploaded by users and/or brands of the platform. The current user (e.g., the user to whom the pages in FIGS. 7A-7M are presented) may select any one of the photos to see which items of the platform, if any, are linked to the selected photo.

User Interface for Uploading a User Photo

As discussed in connection with block 304 of FIG. 3A, block 504 of FIG. 5A, and block 604 of FIG. 6A, the user may decide to upload a user photo to the platform for linking two or more item pages. In the example of FIG. 7A, the current user can activate the (+) button at the bottom of the page 700A to provide an indication to the platform that he or she wishes to upload a user photo. Upon user activation of such a user interface button, the current user may be presented with an option of taking a photo and using the photo for the upload, or choosing an existing photo from the phone's photo gallery.

User Interface for Linking an Item to the User Photo

Figure 7C:
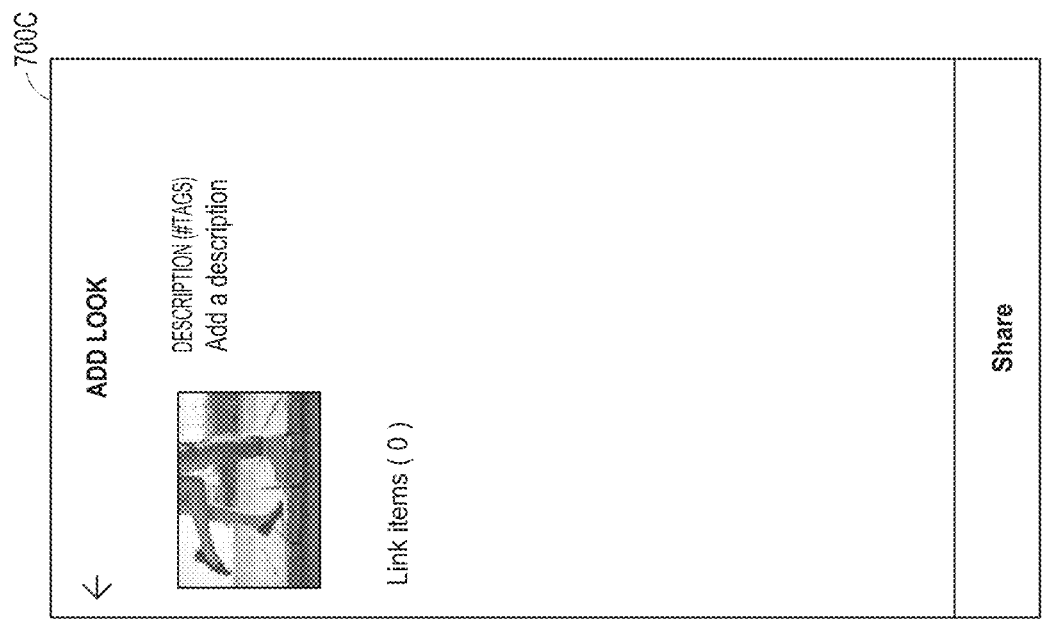

FIG. 7C illustrates the user interface for linking one or more items registered or otherwise available on the platform to the selected/uploaded user photo. As discussed herein, the selected user photo may have already been uploaded to the platform at the time the page 700C is presented to the current user. In another embodiment, only a thumbnail of the selected user photo has been generated (e.g., by the mobile app associated with the platform or other special software provided on the smartphone of the current user) and displayed on page 700C but a copy of the user photo has not yet been uploaded to the platform. In the example of FIG. 7C, the user photo shown at the top left corner of page 700C features one person wearing a pair of boots, and another person wearing a pair of flats. The current user may wish to link the selected user photo to the particular boots shown in the user photo and also to the particular flats shown in the user photo, if the boots and/or the flats are available for linking on the platform. Upon user activation of the user interface button "Link items (0)," page 700D of FIG. 7D is presented to the current user.

User Interface for Identifying an Item on the Platform

As shown in FIG. 7D, page 700D is a view of the screen displayed to the current user via a user computing device and includes a product search bar usable for locating the particular items that the current user wishes to link in the platform database. Page 700D also includes a dimmed version of the user photo, letting the current user know which user photo is being linked to the item(s) to be selected by the current user. In response to the user entering a search term, the platform provides a collection of items that satisfy the search term.

User Interface for Presenting a List of Items and Confirming User Selection

Figure 7F:
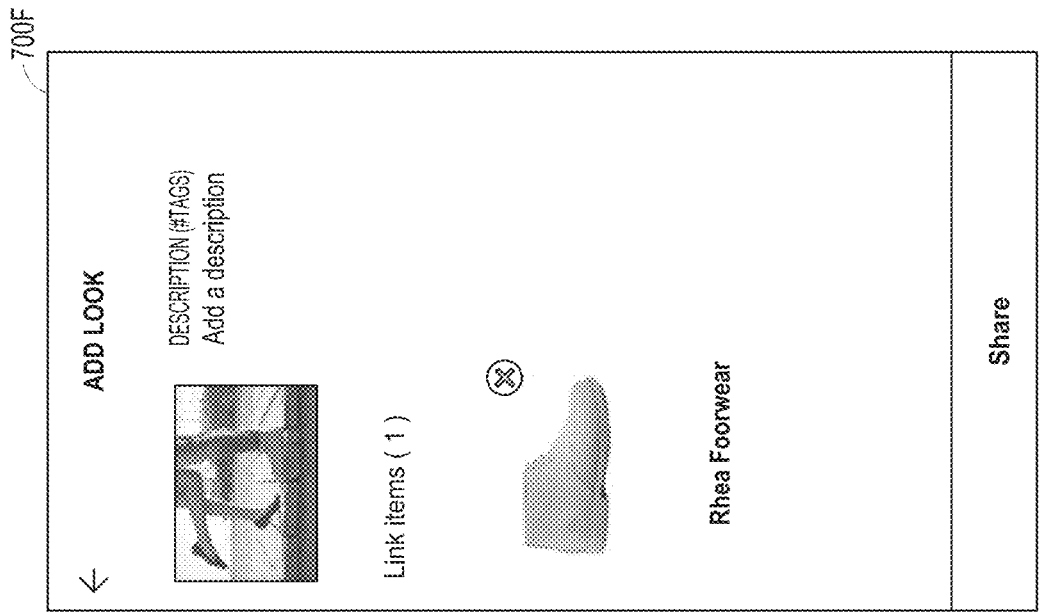
Figure 7E:
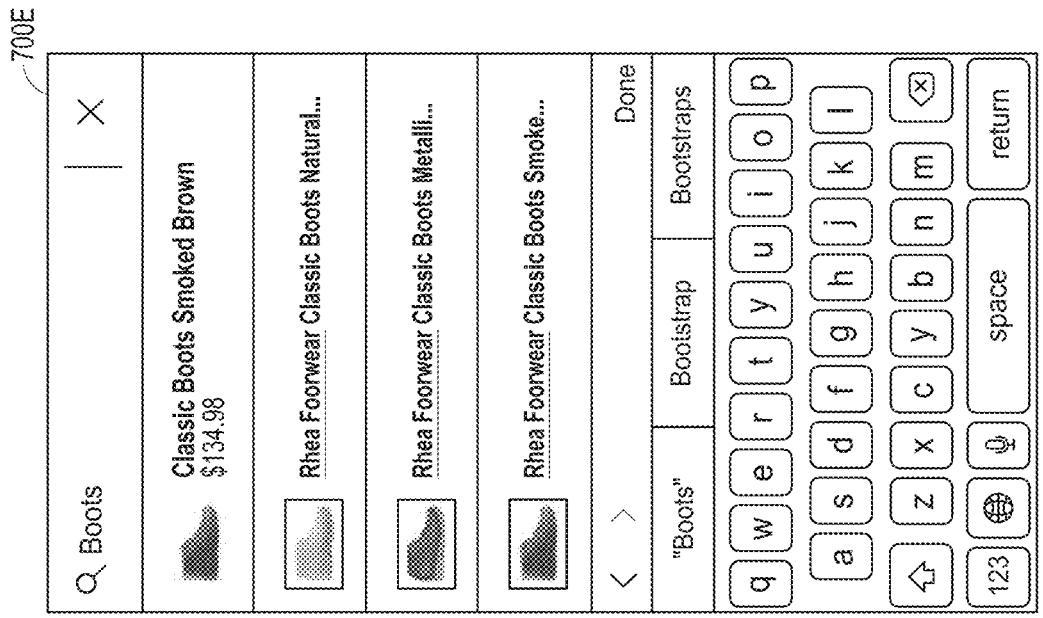
Figure 7H:
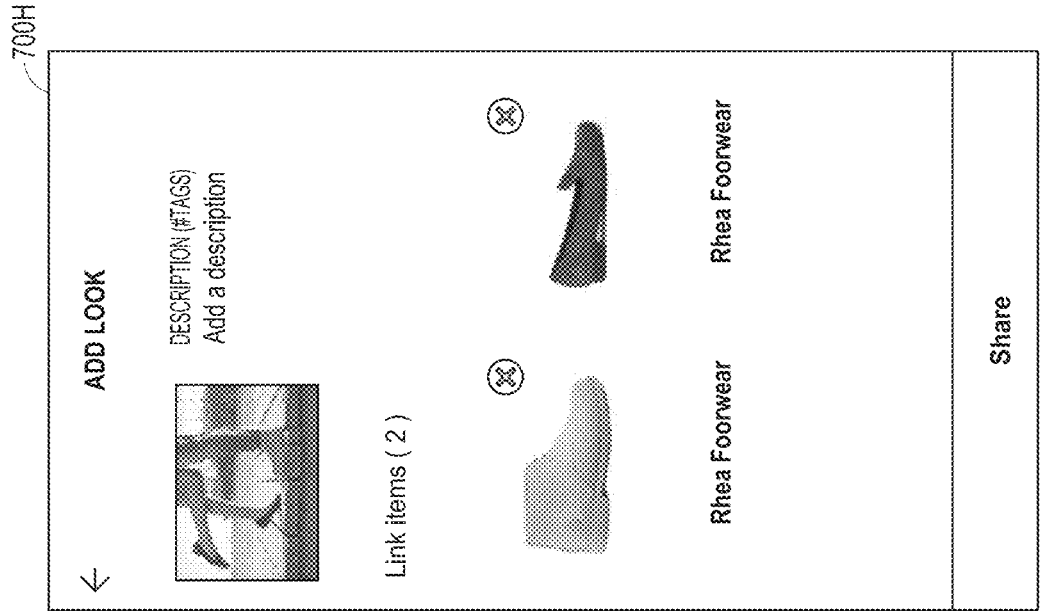
Figure 7G:
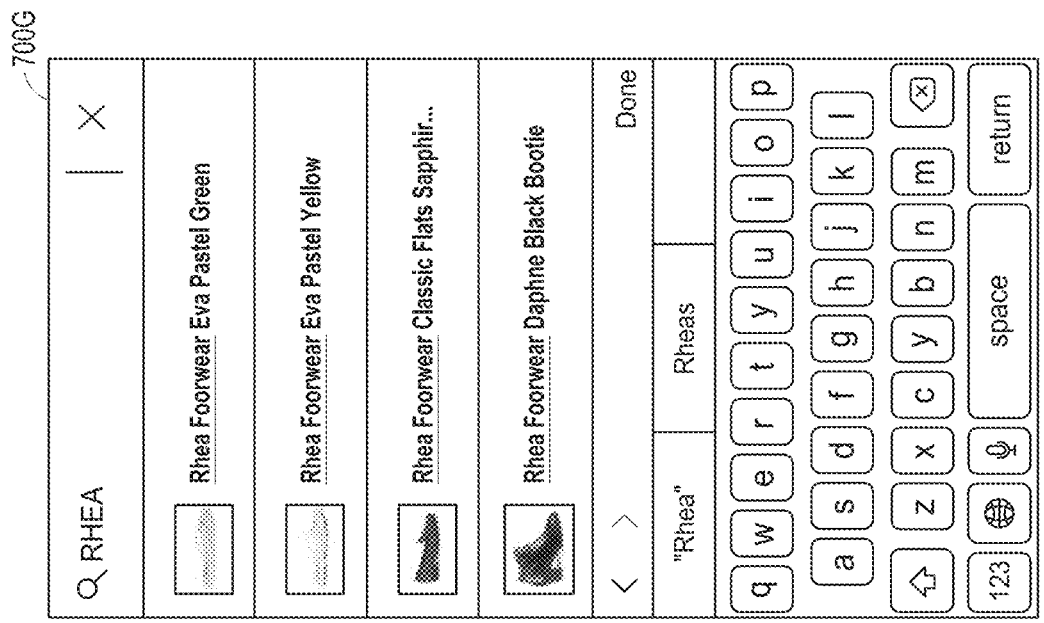
Figure 7J:
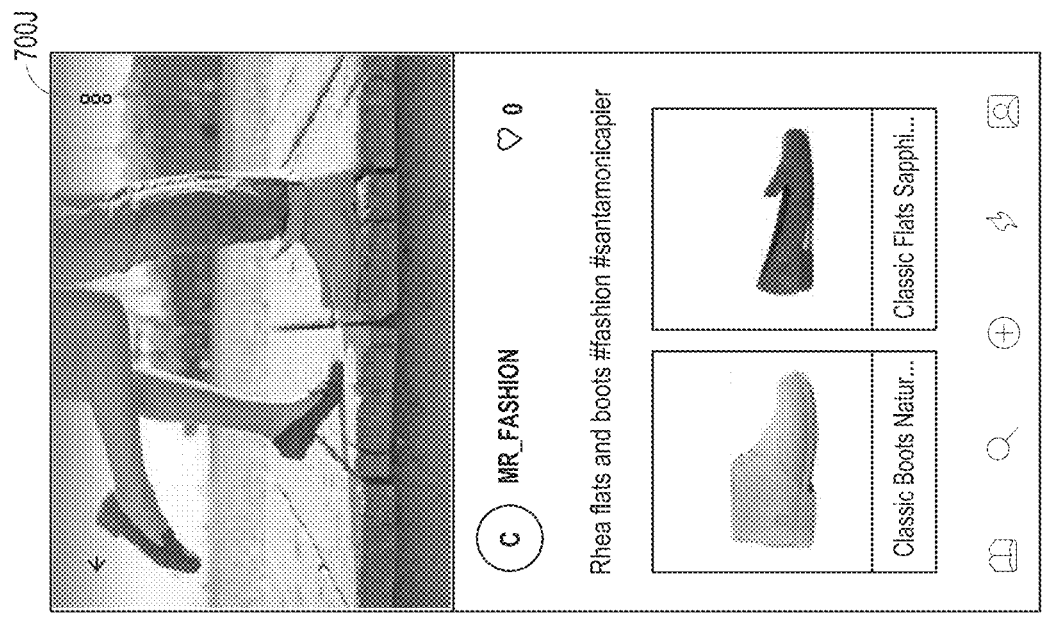

In the example of FIG. 7E, page 700E is a view of the screen displayed to the current user via a user computing device and shows a list of items having "boots" in the item name. The current user may located the particular boots that he or she is looking for in the list of items presented on page 700E. Upon user selection of an item from the list of items, page 700F of FIG. 7F is presented to the current user to confirm the user's selection of the show as shown below the user photo. Page 700F indicates that one link request has been generated with respect to the user photo.

User Interface for Linking Additional Items to the User Photo

Figure 7I:
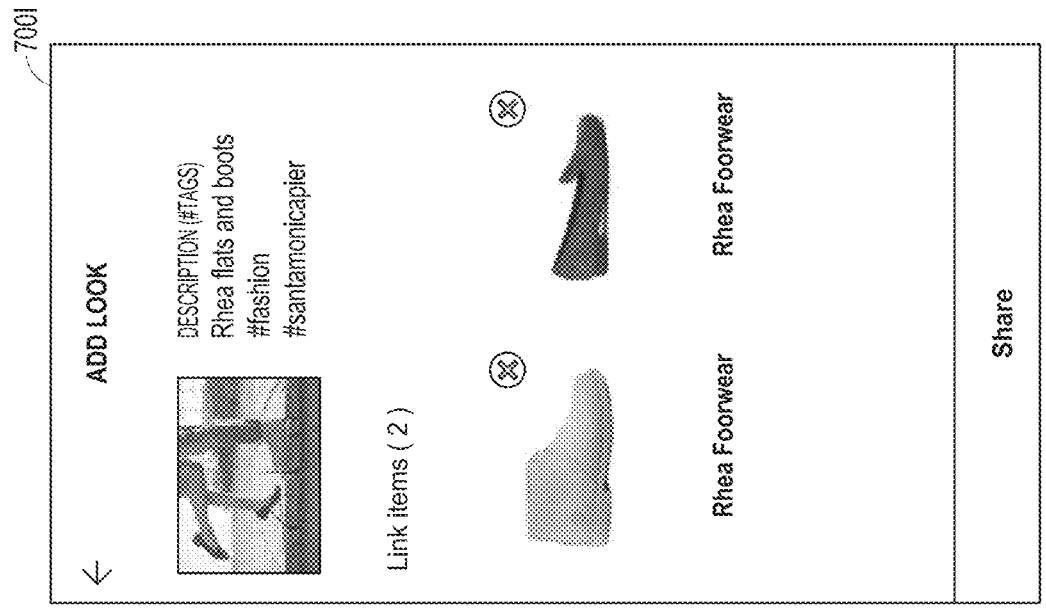
Figures 7K, 7L, 7M:
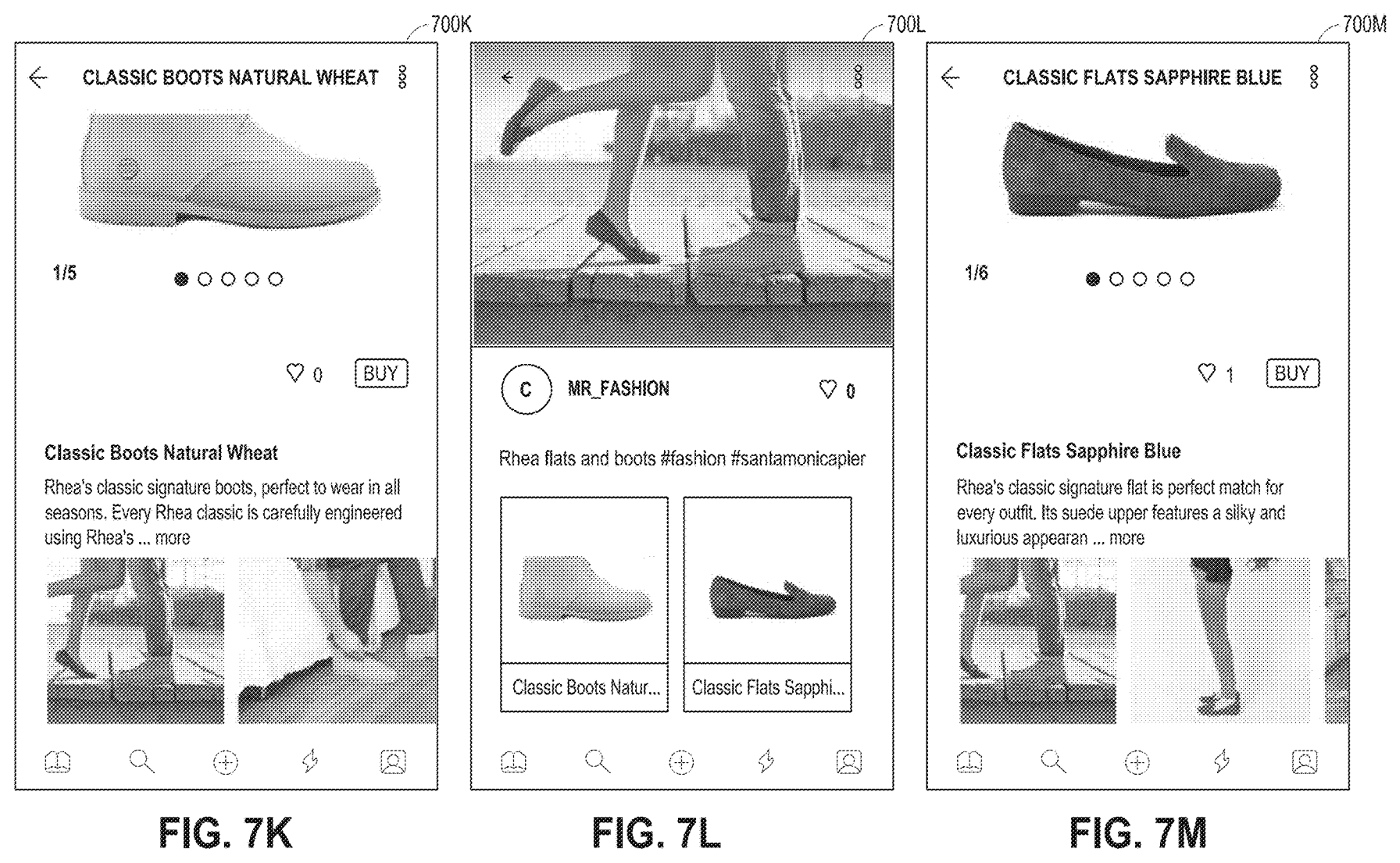

The current user can generate additional link request by repeating the process illustrated in FIGS. 7C-7E. For example, upon user activation of the user interface button "Link items (1)," page 700G is presented to the current user. As shown on page 700G, the current user may search for the item that he or she is looking for using the name of the brand owner (e.g., "Rhea"). Upon user selection of the flats depicted in the user photo, page 700H is presented to the current user. As shown in FIG. 7H, page 700H shows the two link requests generated based on the current user's selection of the boots and the flats from the platform database. As shown in FIG. 7I, the current user may add a description of the user photo prior to submitting the user photo along with the generated link requests. Upon user activation of the user interface button "Share," the user photo selected by the current user and the link requests generated in connection with the selected user photo are provided to the platform.

User Interface for Viewing Uploaded User Photo

Upon the current user's activation of the user interface button "Share" via the user interface shown on page 700I, page 700J is presented to the current user ("MR_FASHION"). In some embodiments, such presentation of page 700J occurs subsequent to the linking of the content entry corresponding to the user photo and the item entries corresponding to the two pairs of shoes selected by the current user, where such linking is performed by the platform in response to the current user's activation of the user interface button "Share" via the user interface shown on page 700I. In some embodiments, page 700J is a view of the screen displayed to the current user via a user computing device and includes the two items for which link requests are generated, regardless of whether the link requests are approved by the respective brand owners. In other embodiments, page 700J includes only those items whose link request has been approved by the brand owner of the item. Page 700J shows the user photo uploaded by the current user at the top of the screen, and the items linked to the user photo at the bottom of the screen. Other users of the platform may access the page 700J and learn that the shoes worn by the individuals pictured in the user photo are the boots and the flats shown at the bottom of the screen.

User Interface for Navigating Between Linked Pages

FIGS. 7K, 7L, and 7M illustrate the navigable path created between page 700K and page 700M. The interaction among 700K, 700L, and 700M may be identical or similar to those that among pages 350, 360, and 370 of FIG. 3C. Upon user selection of the user photo from the boots page 700K, page 700L is presented to the viewing user. Upon user selection of the flats picture provided along with the user photo and the boots picture on page 700L, the flats page 700M is presented to the viewing user. Upon selection of the user photo (e.g., at the bottom left corner of page 700M) on the flats page 700M that also includes a plurality of flats pictures (e.g., six pictures of the flats including the flats picture shown on page 700L) and other user photos depicting the flats (e.g., at the bottom right corner of page 700M), page 700L is presented to the viewing user. Upon user selection of the boots picture provided along with the user photo and the flats picture on page 700L, the boots page 700K is presented to the user, where the boots page 700M includes a plurality of boots pictures (e.g., five pictures of the boots including the boots picture shown on page 700L). The viewing user can navigate to and from the pages 700K and 700M using the user photo uploaded by "MR_FASHION" and links requested by "MR_FASHION" and approved by the respective brand owners (e.g., "Rhea" in this example).

Overview of Creating and Publishing Associations

Figure 8:
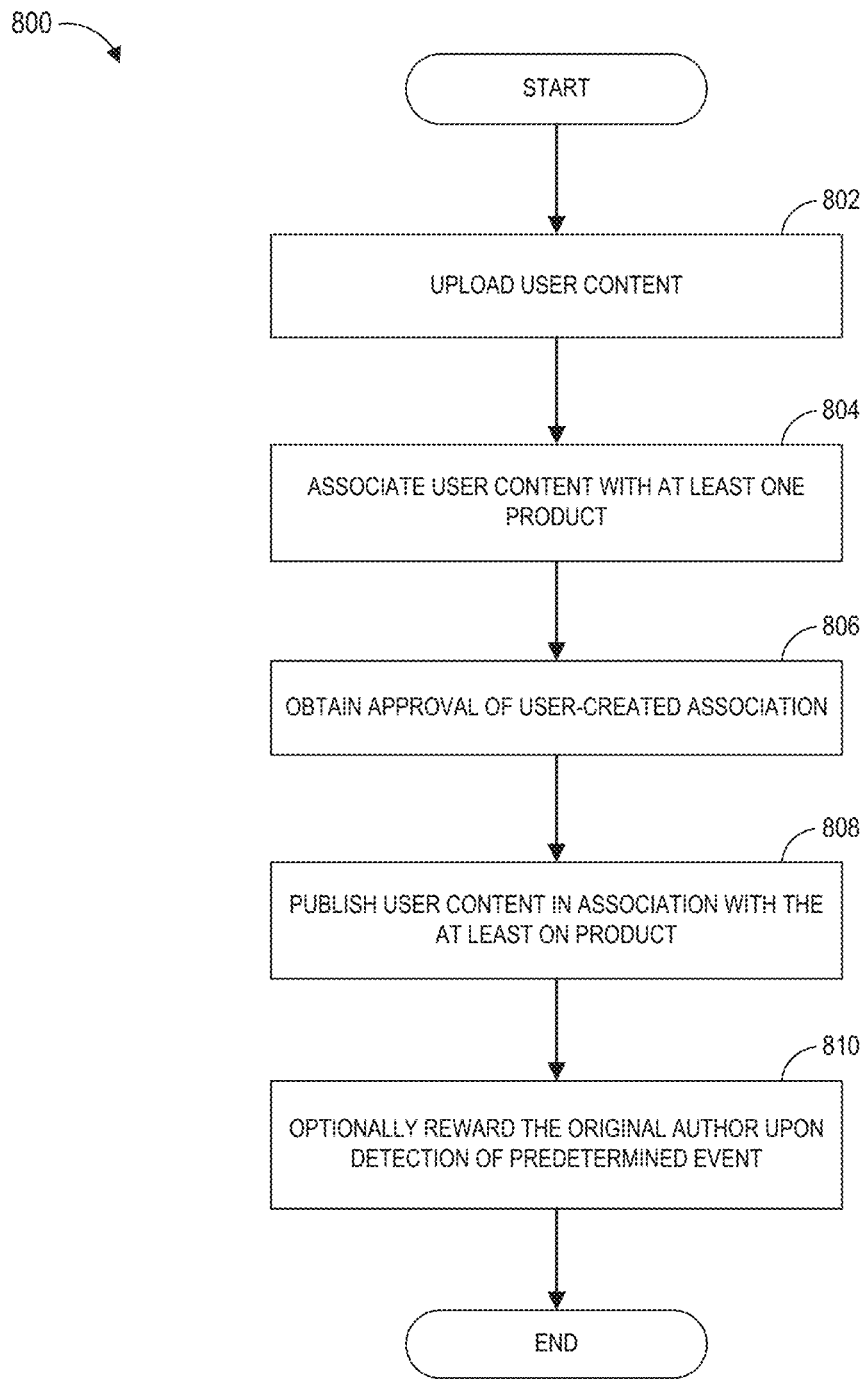
FIG. 8 illustrates a flowchart of creating and publishing associations between user content and client items in accordance with an embodiment.

FIG. 8 is a flowchart for creating and publishing associations, according to an embodiment of the present invention. The steps illustrated in FIG. 8 may be performed by the platform described herein with reference to FIGS. 1A, 1B, and 2, or any components therein, or any other system discussed herein or other devices within the scope of the present disclosure.

Uploading User Content

At block 802, a user uploads a user content on the platform. The uploaded user content may be a photo, a video, or other content generated by the user. The user may upload the user content via a user interface provided by the platform in a browser or a mobile application installed on the user's device (e.g., content generator device 102).

Creating Associations Between User Content and Available Items

At block 804, the platform associates the user content with at least one product available on the platform. The associations may be created based on the user's selection of one or more products presented to the user (e.g., via the display on the user's device). In embodiments, the user content is a photograph showing the user wearing a sweater, where the sweater is one of the items stored in the database maintained by the platform and associated with a specific client stored in the database maintained by the platform. In embodiments, the user content is a video showing the user wearing the sweater.

Consequence of Creating Associations

When an association is created between a user content and an item, a two-way link is established between the user content and the item (e.g., the item is linked to the user content and the user content is linked to the item). In embodiments, the database entry of the user content includes an identifier associated with (or a pointer to) the database entry of the item, and vice versa. For example, if the content generating user uploads a picture illustrating the user wearing a sweater, and the user creates an association between the picture and the sweater (e.g., by selecting from a list of items presented by the platform an item identifier associated with the sweater), the platform, when publishing the user content, may allow a content viewing user to navigate from the picture to the sweater as well as from the sweater to the picture (e.g., from an item detail page of the sweater to the picture). In embodiments, the picture associated with the sweater is displayed along with the item identifier (e.g., which may be a word description, a picture, or a thumbnail) corresponding to the sweater, and when the content viewing user requests to view the sweater associated with the item identifier, the content viewing user may be presented with further details of the sweater along with any user contents with which the sweater is associated. When the content viewing user requests to view one of the user contents associated with the sweater and displayed alongside the sweater, the user may be presented with a full description and/or view of the selected user content, which is then displayed along with any items associated with the selected user content (e.g., the sweater and any other items associated with the user content).

Obtaining Client Approval of User-Requested Association

At block 806, in response to receiving the uploading user's request to associate the user content with the at least one product, the platform obtains client approval of the user-created association between the user content and the at least one product. In embodiments, the platform requests client approval for each product. Additionally or alternatively, the platform requests client approval for each client associated with the at least one product.

Client Approval of User Content Associated with a Single Item

In embodiments, a content generating user can create an association between a user content and a single item associated with a client. When a user content associated with a single item is processed by the platform, the platform generates and transmits an approval request to the client associated with the single item. The approval request may include the user-created association between the user content and the item associated with the client. The client may be presented with a single approval button and a single rejection button that the client can activate to approve or reject the user-created association. Upon detecting client approval of the user-created association, the user content containing the user-created association is published to users associated with the client. The users associated with the client may be followers of the client, friends of the client, or other associates of the client.

Client Approval of User Content Associated with Multiple Items

A user can create an association between a user content and multiple items associated with a single client. When a user content associated with multiple items of a single client is processed by the platform, the platform generates and transmits an approval request to the client associated with the multiple items. The approval request may include the user-created association between the user content and the item associated with the client. The client may be presented with an approval button and a rejection button for each of item associated with the user content. In embodiments, the client may be presented with "approve all" and "reject all" buttons for approving all of the user-created associations and for rejecting all of the user-created associations, respectively. Upon detecting client approval of some or all of the user-created association, the user content containing the approved user-created associations is published to content viewing users associated with the client. For example, in response to detecting that only some of the user-created associations included in the user content have been approved, the rejected user-created associations are removed from the user content before publishing the user content to the content viewing users associated with the client.

Client Approval of User Content Associated with Multiple Clients

A content generating user can create an association between a user content and multiple items associated with multiple clients. The multiple items may each be associated with a different client. Alternatively, some of the multiple items may be associated with a single client. The process of obtaining client approval for an association between a user content and multiple clients is described in greater detail below with reference to FIG. 9.

Publishing User Content in Association with the Associated Item

At block 808, the platform publishes the user content in association with the at least one item associated with the user content based on the obtained client approval. In embodiments, in response to receiving the approval from the client, the platform causes the user content stored on the platform to become viewable by the followers of the client along with the at least one item. The process of publishing a user content based on a client-approved association is described in greater detail below with reference to FIG. 10.

Rewarding Original Content Uploader

At block 810, the platform optionally provides a reward to the original uploader of the user content upon detection of a predetermined event. The predetermined event may be a purchase, a like, a follow, a forward, or other user action by the content viewing users performed in connection with the published user content. The process of rewarding a content generating user is described in greater detail below with reference to FIG. 11.

Requesting Client Approval Based on User-Requested Associations

Figure 9:
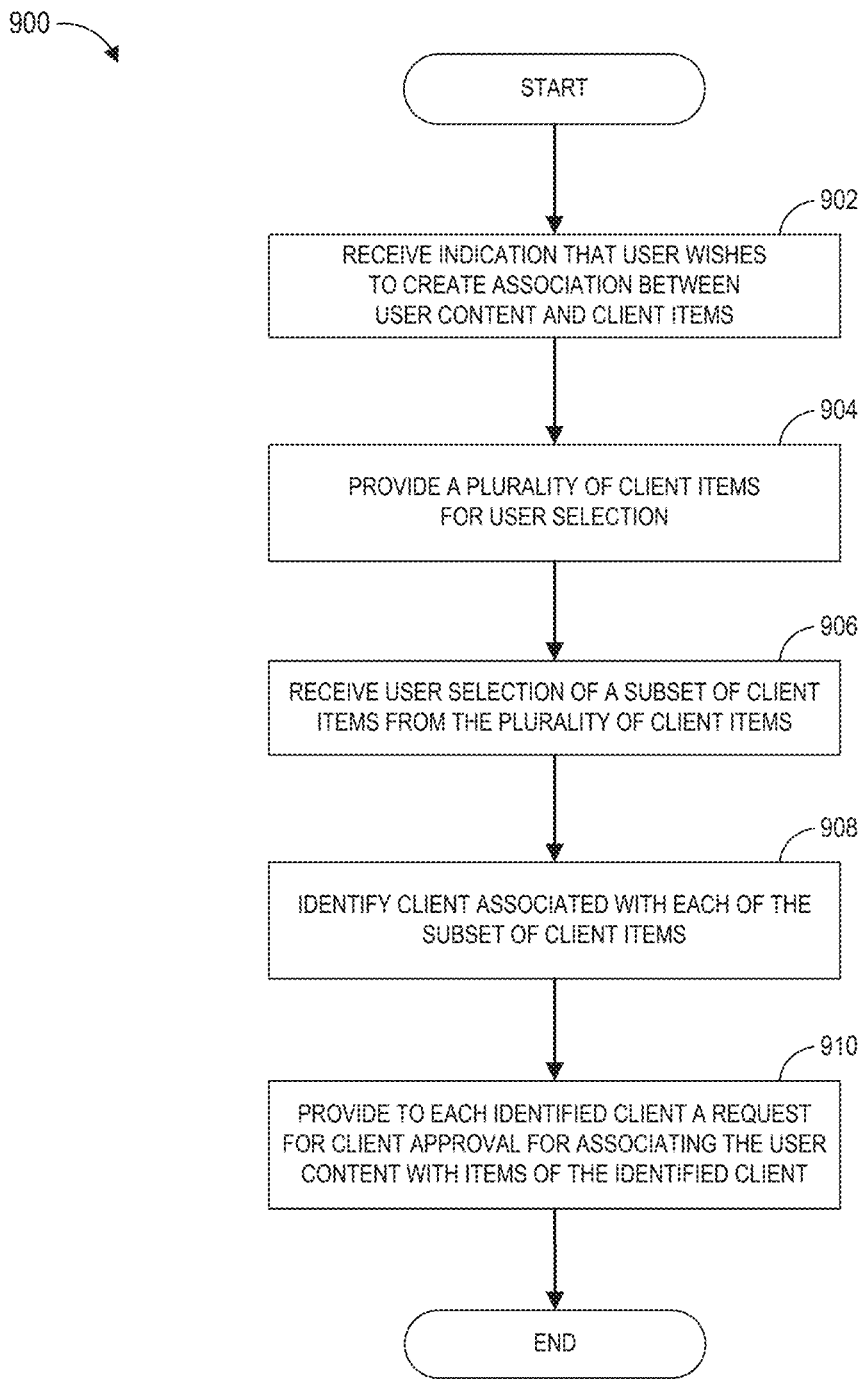
FIG. 9 illustrates a flowchart of sending an approval request to clients based on user-requested associations in accordance with an embodiment.

FIG. 9 is a flowchart for sending an approval request to multiple clients based on user-requested associations, according to an embodiment of the present invention. The steps illustrated in FIG. 9 may be performed by the platform described herein with reference to FIGS. 1A, 1B, and 2, or any components therein, or any other system discussed herein or other devices within the scope of the present disclosure. For convenience, method 900 is described as performed by the platform.

Selectable Option to Associate Content with Items

At block 902, the platform receives an indication that a user wishes to create associations between user content and client items. In embodiments, the content generating user is presented with a selectable option for initiating the association process (e.g., to create associations between one or more client items with the content uploaded by the content generating user) during the upload process. Alternatively or additionally, the content generating user may be presented with the selectable option for associating a user content previously uploaded by the content generating user. In other embodiments, the content generating user may be presented with the selectable option for associating a user content previously uploaded by another user. The request to create associations may be received by the platform upon activation of such a selectable option by the content generating user.

Providing a List of Client Items

At block 904, the platform provides a list of client items for user selection. In embodiments, the list includes client names at the top level, and upon user selection of a client name, the list of items associated with the client name is subsequently provided for user selection. In embodiments, one or more intermediate levels of categories (e.g., clothing, winter clothing, down jackets, etc.) may be used to facilitate the user's selection of client items depicted in the user content uploaded by the user.

Items Associated with Non-Registered Clients

In embodiments, the content generating user can associate a user content only with items associated with one or more clients whose item information (e.g., list of items associated with the client(s)) is stored on or accessible by the platform. In other embodiments, the content generating user can associate a user content with a client identifier associated with a client whose item information is not stored on or accessible by the platform.

Request Non-Registered Client

In response to receiving a user request to associate a user content with a client whose item information is not stored or maintained by the platform, the platform outputs a request option for allowing the user to request that the client's item information be available in the future. In response to user activation of the request option, the platform generates and transmits to the client a request to provide item information to the platform. The client may sign up with the platform via a registration user interface and provide or import a database of items associated with the client. In embodiments, such a request is generated and transmitted to the client after a threshold number of user activations of the request option associated with the client have been detected.

Receiving User Selection of Client Items

At block 906, the platform receives user selection of a subset of the client items provided to the content generating user. For example, if the content generating user wishes to associate a picture depicting the user wearing sweater X made by client A and belt Y made by client B with sweater X and belt Y, the content generating user may select sweater X and belt Y from the list of client items provided by the platform.

Identifying Clients Associated with Selected Client Items

At block 908, the platform identifies the clients associated with the selected client items. For example, if the content generating user has selected sweater X and belt Y, the platform determines the client associated with sweater X (e.g., client A) and the client associated with belt Y (e.g., client B) so that client approval may be requested from the respective clients.

Requesting Client Approval of User-Created Associations

At block 910, the platform provides a client approval request to each identified client. The client approval request may include the user content uploaded by the user content generating user, the association created by the content generating user between the user content and the items of the identified client. In the example above, the request sent to client A may include the picture and sweater X selected by the content generating user, and the request sent to client B may include the picture and belt Y selected by the content generating user. In embodiments, the approval request includes items (or association between the user content and the items) that are not associated with the client receiving the approval request. For example, the request sent to both client X and client Y may include the picture and both sweater X and belt Y.

Providing Approval or Rejection

The client may be presented with an approval button and a rejection button for each of item associated with the user content and belonging to the specific client. For example, if a user content includes a first user-created association associating the user content with a first item associated with a first client and a second user-created association associating the user content with a second item associated with a second client, the approval request (and the user content) sent to the first client includes only the first user-created association and the approval request (and the user content) sent to the second client includes only the second user-created association. Alternatively, the approval request and the user content include both the first and second user-created associations, but only the first user-created association is visible to the first client and only the second user-created association is visible to the second client. In embodiments, the approval request and the user content include both the first and second user-created associations, and both the first and second user-created associations are visible to the first and second clients, but only the first user-created association is presented to the first client for approval and only the second user-created association is presented to the second client for approval.

Approving Multiple Items

The clients may be presented with "approve all" and "reject all" buttons for approving all of such user-created associations and for rejecting all of such user-created associations, respectively. Upon detecting client approval of some or all of the user-created association, the user content containing the approved user-created associations is published to users associated with each client. For example, if a user content included user-created associations A-C belonging to client X and user-created associations D-F belonging to client Y, and only user-created associations A, B, D, and E were approved, the user content published to the content viewing users associated clients X and Y may include only user-created associations A, B, D, and E.

Show or Hide Associations of Other Clients

In embodiments, the platform determines that a client wishes to publish user contents only including item associations belonging to the client, and in response to such a determination, the platform removes all other item associations (e.g., those belonging to other clients) before publishing the user content to the content viewing users associated with the client. For example, if a user content included user-created associations A-C belonging to client X and user-created associations D-F belonging to client Y, and only user-created associations A, B, D, and E were approved, the user content published to the content viewing users associated client X may include only user-created associations A and B if the platform determines that client X wishes to publish user contents only including item associations belonging to client X. On the other hand, if the platform determines that client Y wishes to publish user contents including all item associations, the user content published to the content viewing users associated client Y may include all of user-created associations A, B, D, and E.

Further Editing by Client Prior to Approval/Publication

A client can process or otherwise enhance the user content before approving the user-created associations between the user content and one or more items of the client. For example, the client may place its logo on the user content before approving the user-created associations. In another example, the client may apply a photo filter on the user content before approving the user-created associations. The platform may present "approve as is", "approve with modification", and "reject" buttons for approving the user-created association as is (without modification), for approving the user-created association after modifying the user content containing the user-created association, and for rejecting the user-created association, respectively.

Detection of Incorrectly Associated Item

The client may detect an incorrectly associated item and modify the user-created associations such that the user content is associated with the correct item depicted by the user content. For example, the platform may provide a selectable option to the client for modifying the user-created associations such that the user content is associated with the correct item depicted by the user content. In embodiments, the platform provides a notification to the original content generating user who created the association when the user-created association is modified. Such a notification may include a user approval request for approving the modified association; if the original content generating user approves the modified association, the modified association is considered to have been approved by the client, and if the original content generating user rejects the modified association, the modified association is considered to have been rejected by the client. In other embodiments, the platform modifies the user-created association based on a request by the client without notifying the original content generating user who created the association.

Publication of Client-Approved Associations

Figure 10:
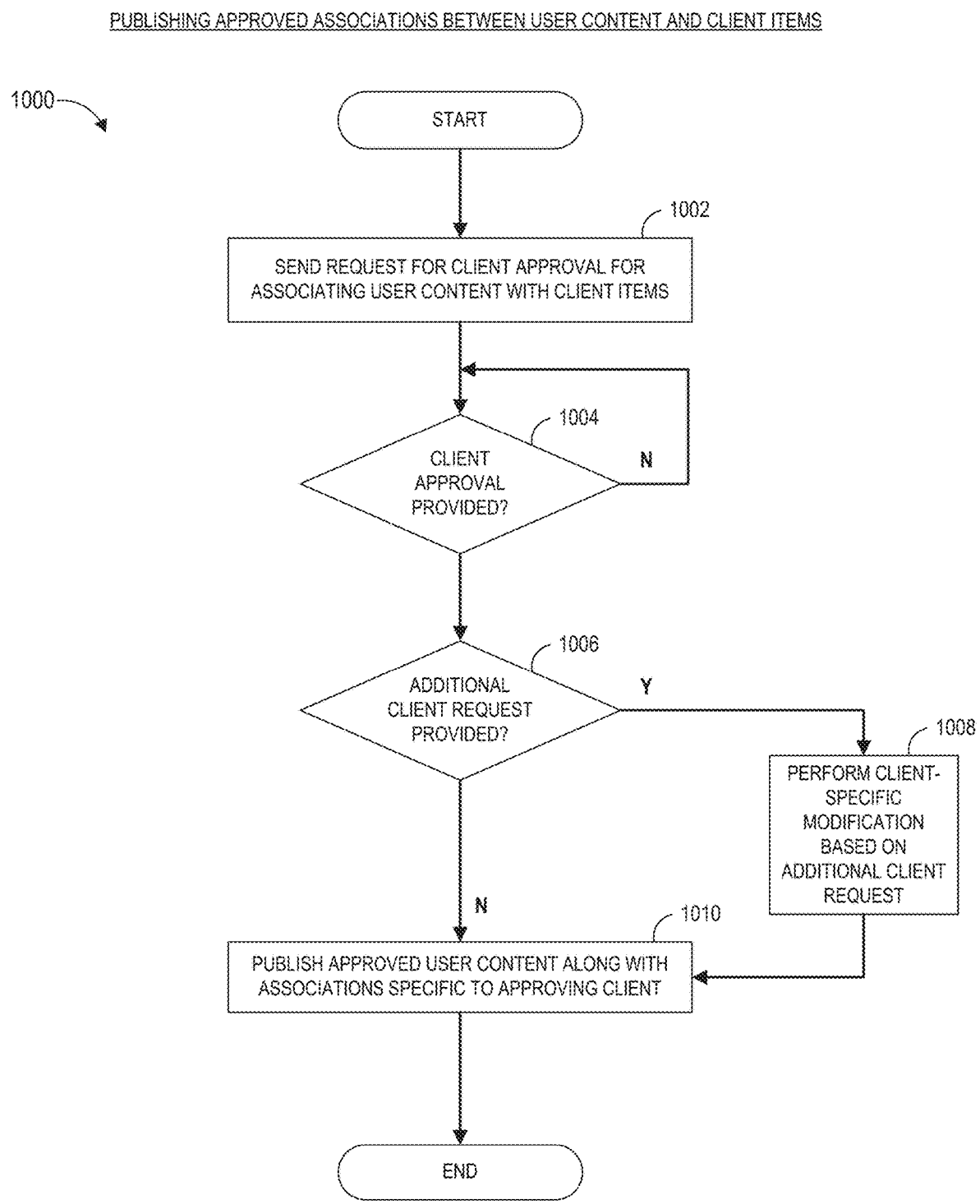
FIG. 10 illustrates a flowchart of publishing client-approved associations between user content and client items in accordance with an embodiment.

FIG. 10 is a flowchart for publishing client-approved associations between a user content and client items, according to an embodiment of the present invention. The steps illustrated in FIG. 10 may be performed by the platform described herein with reference to FIGS. 1A, 1B, and 2, or any components therein, or any other system discussed herein or other devices within the scope of the present disclosure. For convenience, method 1000 is described as performed by the platform.

Requesting Client Approval of User-Created Associations

At block 1002, the platform provides a client approval request to a client for associating a user content with one or more items associated with the client. The client approval request may include the user content uploaded by the user content generating user, the association created by the content generating user between the user content and the items of the identified client.

Receiving Client Approval

At block 1004, the platform determines whether a client approval has been provided. If the platform determines that no client approval has been provided, the method 1000 remains at block 1004 until a client approval is provided. In embodiments, the platform performs the determination of whether a client approval has been provided only in response to receiving a client approval associated with the association.

Receiving Additional Client Request

At block 1006, the platform determines whether the received client approval includes an additional client request. The additional client request may be a request to apply a photo filter to the user content, a request to place additional images or logos on the user content, a request to resize or rotate the user content, and/or a request to modify the associations. If the platform determines that the received client approval includes an additional client request, the method proceeds to block 1008. Otherwise, the method 1000 proceeds to block 1010.

Performing Client-Specific Modification

At block 1008, the platform performs the client-specific modification based on the additional client request. The client-specific modification may include modifying the user content and/or the user-created associations included in the user content.

Publishing Client-Approved User Content

At block 1010, the platform publishes the client-approved user content along with associations created by the content generating user and approved by the client. In embodiments, the platform causes the user content to become viewable by the content viewing users associated with the client approving the user content.

Removing Rejected Associations

In embodiments, the platform removes the rejected associations (e.g., the associations that the client decided not to approve) before publishing the user content to the content viewing users associated with the client. The published user content may include user-created associations that were approved by the client. In embodiments, the platform may provide the client with a selectable option for approving only the user content and not the associations included in the user content. Upon detecting selection of such an option by the client, the platform causes the approved user content to be published to the content viewing users associated with the client without any associations that were previously created for the approved user content by the content generating user.

Publication to Content Generating User's Followers

In embodiments, the platform publishes the user content uploaded by a content generating user to other users (e.g., content viewing users) associated with the content generating user, regardless of whether the user content and/or its associations have been approved by the clients. The user content published to other users associated with the content generating user may include the associations created between the user content and one or more products available on the platform. In some embodiments, the user content published to other users associated with the content generating user includes only those associations that were approved by the corresponding client(s). In some of such embodiments, the user content is not initially displayed along with any of its associated products, but the platform causes the associated products to be displayed along with the user content as the associations become approved by the corresponding client(s). In other embodiments, the user content published to other users associated with the content generating user includes the associations created between the user content and the one or more products regardless of whether the corresponding client(s) approved the associations.

Rewarding Content Generating Users

Figure 11:
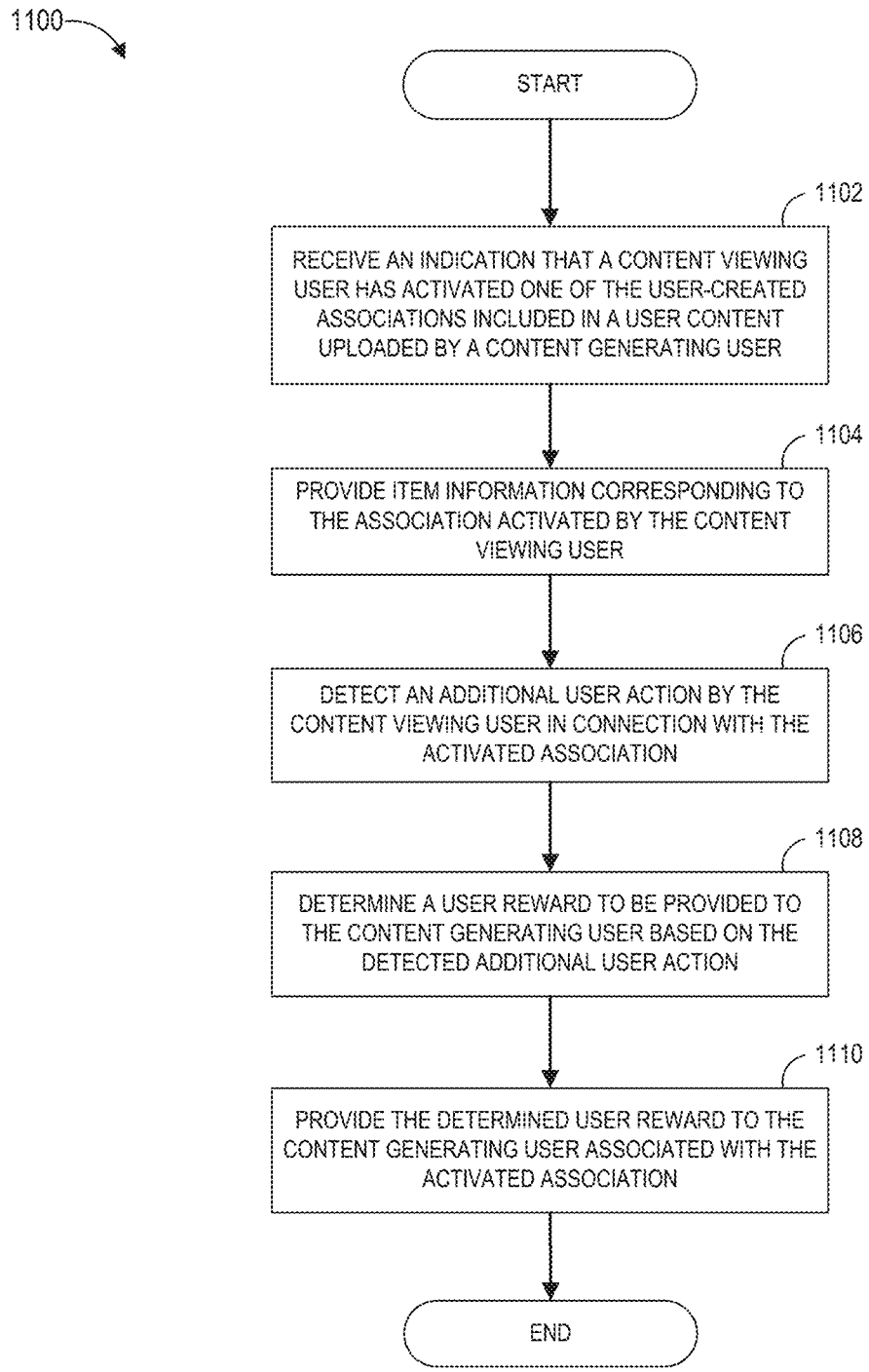
FIG. 11 illustrates a flowchart of rewarding a content generating user based on a detected action by a content viewing user in accordance with an embodiment.

FIG. 11 is a flowchart for rewarding a content generating user based on detected action by a content viewing user, according to an embodiment of the present invention. The steps illustrated in FIG. 11 may be performed by the platform described herein with reference to FIGS. 1A, 1B, and 2, or any components therein, or any other system discussed herein or other devices within the scope of the present disclosure. For convenience, method 1100 is described as performed by the platform.

Detecting a User Action by Content Viewing User

At block 1102, the platform receives an indication that a content viewing user has activated a user-created association included in a user content uploaded by a content generating user. For example, while browsing the content associated with client X, the content viewing user may find a user content previously uploaded by a content generating user and approved by client X. The user content (e.g., picture of the content generating user wearing sweater A designed and sold by client X) may include associations between the user content and sweater A. The content viewing user may click on the picture of sweater A displayed alongside the user content based on the association between the user content and sweater A.

Providing Item Information

At block 1104, the platform provides item information corresponding to the association activated by the content viewing user. In embodiments, the item information includes a picture of the item, a description of the item, and/or a price of the item.

Detecting Reward-Generating Event

At block 1106, the platform detects an additional user action by the content viewing user in connection with the activated association. In embodiments, such an action may include a purchase of the item. Alternatively or additionally, the user action includes one or more of liking the item, liking the client, following the client, capturing the item, downloading the item, forwarding the item to another user, and/or forwarding the client to another user.

Determining User Reward

At block 1108, the platform determines a user reward to be provided to the content generating user based on the detected additional user action. For example, if the user content uploaded by the content generating user and/or the association created by the content generating user generates a sale, a like, a capture, a download, a forward, a follow, or any other action performed in connection with the user content and/or the association, a reward may be provided to the content generating user, for example, to encourage the content generating user to upload more user content and create more associations. The determined reward may be based on one or more parameters associated with the item associated with the user action (e.g., price of the item). Alternatively or additionally, the determined reward may be based on one or more parameters associated with the client associated with the user action (e.g., client-specific percentage of the total sale to be paid to the content generating user). Alternatively or additionally, the determined reward may be based on one or more parameters associated with the content generating user (e.g., whether the content generating user is a VIP user). Alternatively or additionally, for certain actions, the determined reward may be a flat amount regardless of the item or client.

Providing User Reward

At block 1110, the platform provides the determined user reward to the content generating user associated with the activated association. The reward may be provided in the form of a credit usable on the platform. Alternatively or additionally, the reward may have a cash value. Alternatively or additionally, the reward may not have any cash value.

Field of Use

Various embodiments are described in the context of a fashion platform allowing users to browse and purchase fashion products registered by the respective brand owners and to generate and upload user content depicting such fashion products. However, the embodiments are not limited as such, and the techniques described herein may be extended to other industries or fields. For example, the platform may carry cosmetic products, audio products, household products, furniture, or any combinations thereof. As another example, the platform may carry any type of products in industries in which having an abundance of user content depicting such products would provide a competitive advantage.

Example Embodiments (EE)

EE 1. A method for linking a user photo to two or more pages related to products of different brands, the method comprising: providing a publication platform comprising a first page for a first product and a second page for a second product, the first page including a description of the first product, a first photograph featuring the first product, and a first brand of the first product, the second page including a description of the second product, a second photograph featuring the second product, and a second brand of the second product; providing at least one database comprising products, descriptions of products, photographs, and brands such that the first product is linked to the description of the first product, the first photograph featuring the first product, and the first brand of the first product and the second product is linked to the description of the second product, the second photograph featuring the second product, and the second brand of the second product; receiving, from a user, a user photograph featuring at least the first product, the second product, and a person wearing the first product and the second product; receiving, from the user, a link request (i) to link the user photograph and the first product such that the user photograph is displayable on the first page along with the first photograph that is already configured to be displayed on the first page and (ii) to further link the user photograph and the second product such that the user photograph is displayable on the second page along with the second photograph that is already configured to be displayed on the second page; in response to the link request, providing the first brand with a first approval request for the first brand's approval or disapproval of linking the user photograph and the first product; in response to the link request, providing the second brand with a second approval request for the second brand's approval or disapproval of linking the user photograph and the second product; receiving, subsequent to providing the first brand with the first approval request, the first brand's approval of linking the user photograph and the first product and further receiving, subsequent to providing the second brand with the second approval request, the second brand's approval of linking the user photograph and the second product; and in response to both of the first brand's approval and the second brand's approval, linking, in the at least one database, the user photograph to each of the first product and the second product such that each of the first and second pages features the user photograph and further configuring the first and second pages such that selection of the user photograph on the first page leads to displaying at least one element of the second page and further such that selection of the user photograph on the second page leads to displaying at least one element of the first page.

EE 2. The method of EE 1, wherein the at least one element of the first page comprises one or more of the description of the first product, the first photograph featuring the first product, or a hyperlink pointing to the first page provided on the publication platform, and the at least one element of the second page comprises one or more of the description of the second product, the second photograph featuring the second product, or a hyperlink pointing to the second page provided on the publication platform.

EE 3. The method of EE 1, further comprising, subsequent to receiving the first brand's approval and the second brand's approval, causing the user photograph to be displayed on the first page along with the first photograph featuring the first product and on the second page along with the second photograph featuring the second product.

EE 4. The method of EE 1, further comprising: causing the user photograph to be displayed along with each of the first and second photographs; and performing one of (i) in response to selection of the first photograph by the user, causing the first page to be displayed, and (ii) in response to selection of the second photograph by the user, causing the second page to be displayed.

EE 5. The method of EE 4, further comprising causing the first phage to be displayed without accessing an external link pointing to a page located outside the publication platform.

EE 6. The method of EE 1, further comprising linking, in the at least one database, the user photograph to each of the first product and the second product without associating the user photograph with any external links pointing to a page located outside the publication platform.

EE 7. The method of EE 1, further comprising, receiving, from the user, an indication that a third product featured in the user photograph is unavailable on the publication platform.

EE 8. The method of EE 7, further comprising in response to receiving the indication that the third product featured in the user photograph is unavailable on the publication platform, cropping a portion of the user photograph showing the third product and associating, in the at least one database, the cropped portion with the third product.

EE 9. The method of EE 8, further comprising causing the cropped portion to be displayed along with the first photograph and the second photograph, wherein selection of the cropped portion by the user does not lead to displaying any additional elements of another page of the publication platform.

EE 10. The method of EE 1, wherein the publication platform further comprises a third page for a third product, the third page including a description of the third product, a third photograph featuring the third product, and a third brand of the third product, wherein the link request further includes a request to link the user photograph and the third product such that the user photograph is displayable on the third page along with the third photograph that is already configured to be displayed on the third page, the method further comprising: in response to the link request, providing the third brand with a third approval request for the third brand's approval or disapproval of linking the user photograph and the third product; subsequently receiving the third brand's disapproval of linking the user photograph and the third product; and in response to the third brand's disapproval, refraining from linking, in the at least one database, the user photograph to the third product such that the third page does not feature the user photograph.

EE 11. The method of EE 10, further comprising causing the third photograph, for which linking was disapproved, to be displayed along with the first photograph and the second photograph, for each of which linking was approved, wherein selection of the third photograph by the user does not lead to displaying any additional elements of the third page.

EE 12. The method of EE 1, further comprising: in response to selection of the user photograph displayed on the first page, determining, based on the at least one database, a complete set of products linked to the user photograph, wherein the complete set of products includes the first product, the second product, and one or more additional products; and causing, for each product in the complete set of products, a photograph featuring the product to be displayed along with the user photograph.

EE 13. The method of EE 1, further comprising: receiving, from the user, a request to initiate generation of the link request for the user photograph; and in response to the request to initiate generation of the link request, causing a dimmed version of the user photograph to be displayed along with a search user interface configured to enable the user to identify one or more products to be requested to be linked to the user photograph.

EE 14. A system for linking a user photo to two or more pages related to products of different brands, the system comprising: a publication platform comprising a first page for a first product and a second page for a second product, the first page including a description of the first product, a first photograph featuring the first product, and a first brand of the first product, the second page including a description of the second product, a second photograph featuring the second product, and a second brand of the second product; and at least one database comprising products, descriptions of products, photographs, and brands such that the first product is linked to the description of the first product, the first photograph featuring the first product, and the first brand of the first product and the second product is linked to the description of the second product, the second photograph featuring the second product, and the second brand of the second product, wherein the publication platform is configured to: receive, from a user, a user photograph featuring at least the first product, the second product, and a person wearing the first product and the second product; receive, from the user, a link request (i) to link the user photograph and the first product such that the user photograph is displayable on the first page along with the first photograph that is already configured to be displayed on the first page and (ii) to further link the user photograph and the second product such that the user photograph is displayable on the second page along with the second photograph that is already configured to be displayed on the second page; in response to the link request, provide the first brand with a first approval request for the first brand's approval or disapproval of linking the user photograph and the first product; in response to the link request, provide the second brand with a second approval request for the second brand's approval or disapproval of linking the user photograph and the second product; receive, subsequent to providing the first brand with the first approval request, the first brand's approval of linking the user photograph and the first product, and further receive, subsequent to providing the second brand with the second approval request, the second brand's approval of linking the user photograph and the second product; and in response to both of the first brand's approval and the second brand's approval, link, in the at least one database, the user photograph to each of the first product and the second product such that each of the first and second pages features the user photograph, and further configure the first and second pages such that selection of the user photograph on the first page leads to displaying at least one element of the second page and further such that selection of the user photograph on the second page leads to displaying at least one element of the first page.

EE 15. The system of EE 14, wherein the at least one element of the first page comprises one or more of the description of the first product, the first photograph featuring the first product, or a hyperlink pointing to the first page provided on the publication platform, and the at least one element of the second page comprises one or more of the description of the second product, the second photograph featuring the second product, or a hyperlink pointing to the second page provided on the publication platform.

EE 16. The system of EE 14, wherein the publication platform is further configured to, subsequent to receiving the first brand's approval and the second brand's approval, cause the user photograph to be displayed on the first page along with the first photograph featuring the first product and on the second page along with the second photograph featuring the second product.

EE 17. The system of EE 14, wherein the publication platform is further configured to: cause the user photograph to be displayed along with each of the first and second photographs; and perform one of (i) in response to selection of the first photograph by the user, cause the first page to be displayed, and (ii) in response to selection of the second photograph by the user, cause the second page to be displayed.

EE 18. The system of EE 14, wherein the publication platform is further configured to: receive, from the user, an indication that a third product featured in the user photograph is unavailable on the publication platform; in response to receiving the indication that the third product featured in the user photograph is unavailable on the publication platform, crop a portion of the user photograph showing the third product and associate, in the at least one database, the cropped portion with the third product; and cause the cropped portion to be displayed along with the first photograph and the second photograph, wherein selection of the cropped portion by the user does not lead to displaying any additional elements of another page of the publication platform.

EE 19. The system of EE 14, wherein the publication platform further comprises a third page for a third product, the third page including a description of the third product, a third photograph featuring the third product, and a third brand of the third product, wherein the link request further includes a request to link the user photograph and the third product such that the user photograph is displayable on the third page along with the third photograph that is already configured to be displayed on the third page, wherein the publication platform is further configured to: in response to the link request, provide the third brand with a third approval request for the third brand's approval or disapproval of linking the user photograph and the third product; receive, subsequent to subsequent to providing the third brand with the third approval request, the third brand's disapproval of linking the user photograph and the third product; in response to the third brand's disapproval, refrain from linking, in the at least one database, the user photograph to the third product such that the third page does not feature the user photograph; and cause the third photograph, for which linking was disapproved, to be displayed along with the first photograph and the second photograph, for each of which linking was approved, wherein selection of the third photograph by the user does not lead to displaying any additional elements of the third page.

EE 20. The system of EE 14, wherein the publication platform is further configured to: in response to selection of the user photograph displayed on the first page, determine, based on the at least one database, a complete set of products linked to the user photograph, wherein the complete set of products includes the first product, the second product, and one or more additional products; and cause, for each product in the complete set of products, a photograph featuring the product to be displayed along with the user photograph.

Other Considerations

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, and that various changes in form and details may be made without departing from the spirit and scope of the present disclosure as set forth in the following claims.

What is claimed is:

1. A method for linking a user photo to two or more pages related to products of different brands, the method comprising:
   providing a network platform comprising a first page for a first product and a second page for a second product, wherein the first page includes a description of the first product, a first photograph featuring the first product, and a first brand of the first product, and wherein the second page includes a description of the second product, a second photograph featuring the second product, and a second brand of the second product;
   providing at least one database comprising identifications of products, descriptions of products, photographs, and brands such that the first product is linked to the description of the first product, the first photograph featuring the first product, and the first brand of the first product and further such that the second product is linked to the description of the second product, the second photograph featuring the second product, and the second brand of the second product;
   receiving, from a user, a user photograph featuring at least the first product and the second product;
   providing a user interface for identifying at least one of the products stored in the at least one database to be linked to the user photograph;
   receiving, from the user, a link request (i) to link the user photograph and the first product such that the user photograph is displayable on the first page along with the first photograph and (ii) to further link the user photograph and the second product such that the user photograph is displayable on the second page along with the second photograph;
   in response to the link request, providing a first approval request to a first entity associated with the first brand for the first entity's approval or disapproval of linking the user photograph and the first product in the at least one database;
   in response to the link request, providing a second approval request to a second entity associated with the second brand for the second entity's approval or disapproval of linking the user photograph and the second product in the at least one database;
   receiving, subsequent to providing the first entity with the first approval request, the first entity's approval of linking the user photograph and the first product;
   receiving, subsequent to providing the second entity with the second approval request, the second entity's approval of linking the user photograph and the second product; and
   in response to both of the first entity's approval and the second entity's approval, linking, in the at least one database, the user photograph to each of the first product and the second product such that the user photograph is displayable on the first page along with the first photograph and displayable on the second page along with the second photograph.

2. The method of claim 1, further comprising, subsequent to receiving the first entity's approval and the second entity's approval, causing the user photograph to be displayed on the first page along with the first photograph featuring the first product and on the second page along with the second photograph featuring the second product.

3. The method of claim 1, further comprising:
   causing the user photograph to be displayed along with each of the first and second photographs; and
   performing one of (i) in response to selection of the first photograph by the user, causing the first page to be displayed, and (ii) in response to selection of the second photograph by the user, causing the second page to be displayed.

4. The method of claim 3, further comprising causing the first page to be displayed without accessing an external link pointing to a page located outside the network platform.

5. The method of claim 1, further comprising linking, in the at least one database, the user photograph to each of the first product and the second product without associating the user photograph with any external links pointing to a page located outside the network platform.

6. The method of claim 1, further comprising:
   in response to selection of the user photograph displayed on the first page, determining, based on the at least one database, a complete set of products linked to the user photograph, wherein the complete set of products includes the first product, the second product, and one or more additional products; and causing, for each product in the complete set of products, an image associated with the product to be displayed along with the user photograph.

7. The method of claim 1, further comprising receiving, from the user, an indication that a third product featured in the user photograph is unavailable on the network platform.

8. The method of claim 7, further comprising in response to receiving the indication that the third product featured in the user photograph is unavailable on the network platform, cropping a portion of the user photograph showing the third product and associating, in the at least one database, the cropped portion with the third product.

9. The method of claim 8, further comprising causing the cropped portion to be displayed along with the first photograph and the second photograph, wherein selection of the cropped portion by the user does not lead to displaying any additional elements of another page of the network platform.

10. The method of claim 1, further comprising causing a dimmed version of the user photograph to be displayed behind one or more user interface elements included in the user interface for identifying the products stored in the at least one database to be linked to the user photograph.

11. A system for linking a user photo to two or more pages related to products of different brands, the system comprising:

a network platform implemented using one or more computing devices, the network platform comprising a first page for a first product and a second page for a second product, the first page including a description of the first product, a first photograph featuring the first product, and a first brand of the first product, the second page including a description of the second product, a second photograph featuring the second product, and a second brand of the second product; and at least one database implemented using physical computer storage, the at least one database comprising products, descriptions of products, photographs, and brands such that the first product is linked to the description of the first product, the first photograph featuring the first product, and the first brand of the first product and the second product is linked to the description of the second product, the second photograph featuring the second product, and the second brand of the second product, wherein the one or more computing devices of the network platform are configured to at least:

receive, from a user, a user photograph featuring at least the first product and the second product;

providing a user interface for identifying at least one of the products stored in the at least one database to be linked to the user photograph;

receive, from the user, a link request (i) to link the user photograph and the first product such that the user photograph is displayable on the first page along with the first photograph and (ii) to further link the user photograph and the second product such that the user photograph is displayable on the second page along with the second photograph;

in response to the link request, provide a first approval request to a first entity associated with the first brand for the first entity's approval or disapproval of linking the user photograph and the first product in the at least one database;

in response to the link request, provide a second approval request to a second entity associated with the second brand for the second entity's approval or disapproval of linking the user photograph and the second product in the at least one database;

receive, subsequent to providing the first entity with the first approval request, the first entity's approval of linking the user photograph and the first product;

receive, subsequent to providing the second entity with the second approval request, the second entity's approval of linking the user photograph and the second product; and in response to both of the first entity's approval and the second entity's approval, link, in the at least one database, the user photograph to each of the first product and the second product such that the user photograph is displayable on the first page along with the first photograph and displayable on the second page along with the second photograph.

12. The system of claim 11, wherein the one or more computing devices are further configured to, subsequent to receiving the first entity's approval and the second entity's approval, cause the user photograph to be displayed on the first page along with the first photograph featuring the first product and on the second page along with the second photograph featuring the second product.

13. The system of claim 11, wherein the one or more computing devices are further configured to:

cause the user photograph to be displayed along with each of the first and second photographs; and perform one of (i) in response to selection of the first photograph by the user, causing the first page to be displayed, and (ii) in response to selection of the second photograph by the user, causing the second page to be displayed.

14. The system of claim 13, wherein the one or more computing devices are further configured to cause the first page to be displayed without accessing an external link pointing to a page located outside the network platform.

15. The system of claim 11, wherein the one or more computing devices are further configured to link, in the at least one database, the user photograph to each of the first product and the second product without associating the user photograph with any external links pointing to a page located outside the network platform.

16. The system of claim 11, wherein the one or more computing devices are further configured to:

in response to selection of the user photograph displayed on the first page, determine, based on the at least one database, a complete set of products linked to the user photograph, wherein the complete set of products includes the first product, the second product, and one or more additional products; and cause, for each product in the complete set of products, an image associated with the product to be displayed along with the user photograph.

17. The system of claim 11, wherein the one or more computing devices are further configured to receive, from the user, an indication that a third product featured in the user photograph is unavailable on the network platform.

18. The system of claim 17, wherein the one or more computing devices are further configured to, in response to receiving the indication that the third product featured in the user photograph is unavailable on the network platform, crop a portion of the user photograph showing the third product and associating, in the at least one database, the cropped portion with the third product.

19. The system of claim 18, wherein the one or more computing devices are further configured to cause the cropped portion to be displayed along with the first photograph and the second photograph, wherein selection of the cropped portion by the user does not lead to displaying any additional elements of another page of the network platform.

20. The system of claim 11, wherein the one or more computing devices are further configured to cause a dimmed version of the user photograph to be displayed behind one or more user interface elements included in the user interface for identifying the products stored in the at least one database to be linked to the user photograph.

* * * * *